United States Patent [19]
Mashitani et al.

[11] Patent Number: 5,986,804
[45] Date of Patent: Nov. 16, 1999

[54] STEREOSCOPIC DISPLAY

[75] Inventors: Ken Mashitani, Nara; Goro Hamagishi, Toyonaka; Keiichi Kanatani, Hyogo, all of Japan

[73] Assignee: Sanyo Electric Co., Ltd., Moriguchi, Japan

[21] Appl. No.: 08/854,174

[22] Filed: May 9, 1997

[30] Foreign Application Priority Data

| May 10, 1996 | [JP] | Japan | 8-116651 |
| Nov. 29, 1996 | [JP] | Japan | 8-319170 |
| Mar. 25, 1997 | [JP] | Japan | 9-072145 |

[51] Int. Cl.$^6$ .............. G02B 27/22; H04N 7/18; H04N 7/00; H04N 13/04
[52] U.S. Cl. .............. 359/462; 359/467; 348/94; 348/116; 348/51
[58] Field of Search ............... 359/462, 467; 348/51, 56, 54, 60, 116, 94; 434/323

[56] References Cited

U.S. PATENT DOCUMENTS

| 4,541,007 | 9/1985 | Nagata | 359/462 |
| 4,829,365 | 5/1989 | Eichenlaub | 359/462 |
| 5,465,175 | 11/1995 | Woodgate et al. | 359/462 |
| 5,663,831 | 9/1997 | Mashitani et al. | 359/462 |

*Primary Examiner*—Cassandra Spyrou
*Assistant Examiner*—Audrey Chang
*Attorney, Agent, or Firm*—Nikaido, Marmelstein, Murray & Oram, LLP

[57] ABSTRACT

The present invention provides a stereoscopic display comprising an indicator for teaching to a user the position where a stereoscopic image is viewed. The stereoscopic display for separating light beams from a left eye image and a right eye image which are displayed on a display panel into left image light beams and right image light beams and supplying the left image light beams and the right image light beams to a viewer comprises a light emitting unit composed of a green light emitting diode and a red light emitting diode and a barrier plate arranged in front of the light emitting unit on the side of the viewer and having a slit through which part of the light beams from the light emitting diode are passed toward the viewer. The light emitting unit and the barrier plate are so constructed that light beams incident on the right and left eyes through the slit are light beams from the light emitting diodes in the same color in a stereoscopic view position which is the position where a stereoscopic image is viewed, while being light beams from the light emitting diodes in different colors in a pseudo-stereoscopic view position.

36 Claims, 27 Drawing Sheets

Fig.6A
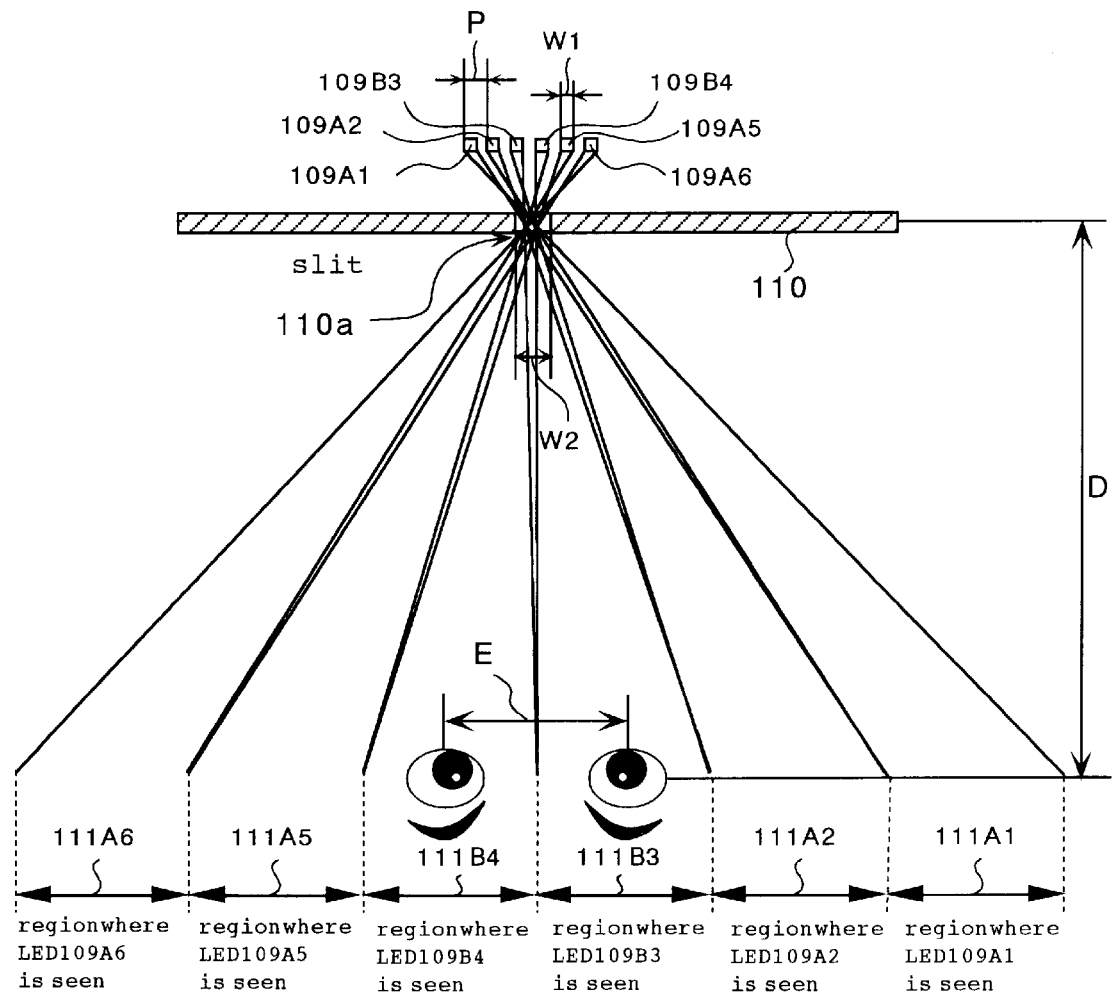
Fig.6B
| LED | 109A1 | 109A2 | 109B3 | 109B4 | 109A5 | 109A6 |
|---|---|---|---|---|---|---|
| combination 1 | red | red | green | green | red | red |
| combination 2 | ☆ | ☆ | ○ | ○ | ☆ | ☆ |
Fig.6C
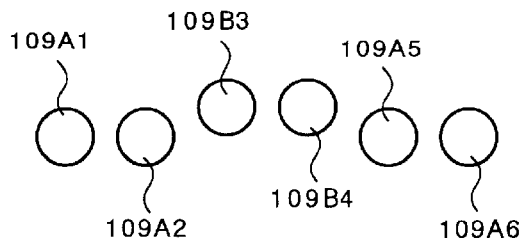

Fig. 7A
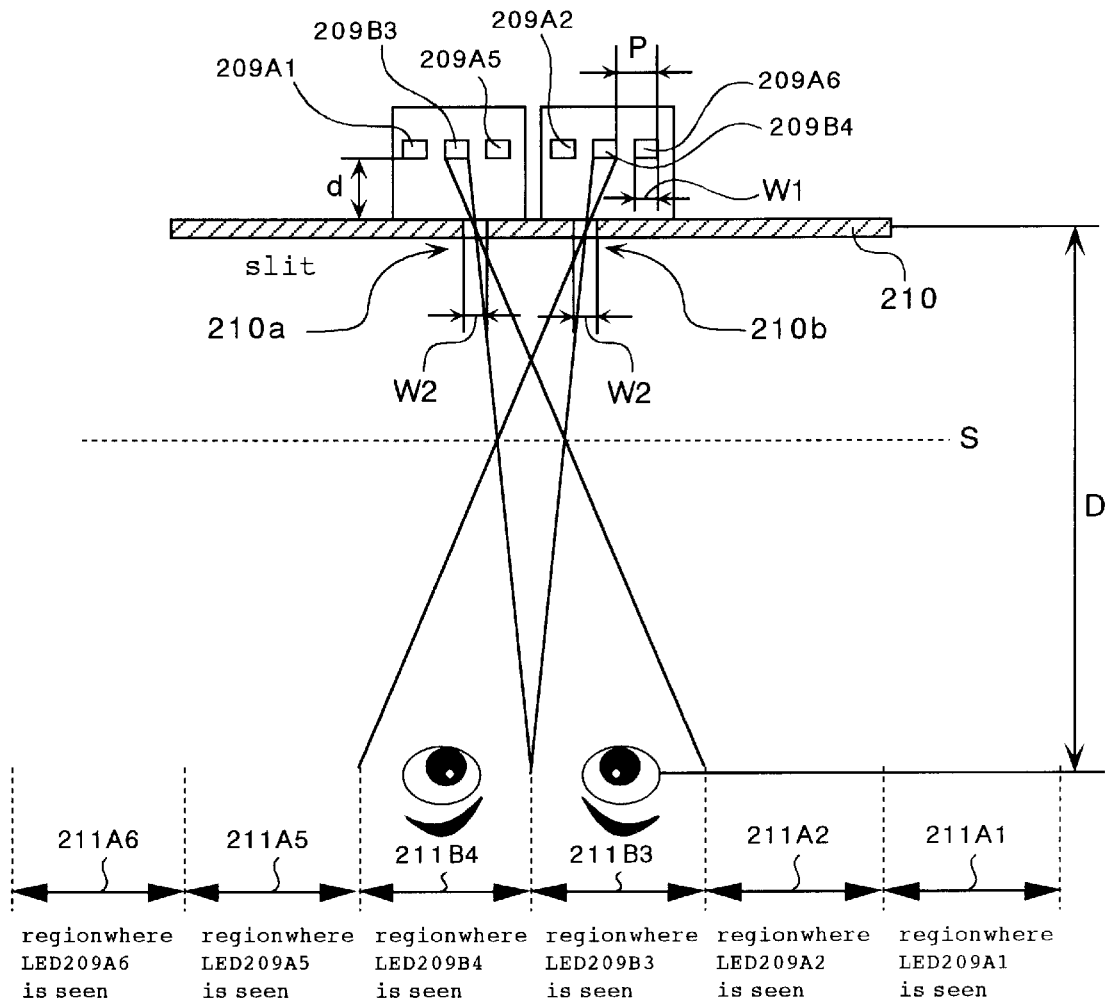
Fig. 7B
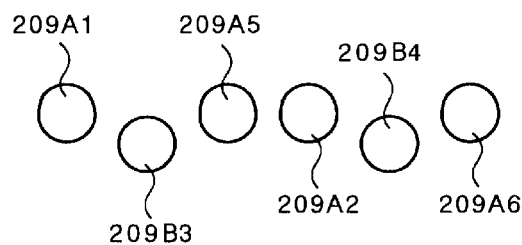
Fig. 7C

Priot Art

STEREOSCOPIC DISPLAY

BACKGROUND OF THE INVENTION

1. Field of the Invention

The present invention relates generally to a stereoscopic (3-D) display capable of viewing a stereoscopic image without using special glasses, and more particularly, to an indicator for teaching to a viewer the position where a stereoscopic image can be viewed.

2. Description of the Prior Art

A stereoscopic display capable of viewing a stereoscopic image without using special glasses has been conventionally known. In the stereoscopic display, a parallax barrier, a lenticulated lens, and the like are arranged on the side of a viewer of a display screen of a display panel such as a liquid crystal display panel. Consequently, the stereoscopic display separates light beams from a left eye image and a right eye image which are displayed on the display panel into left image light beams and right image light beams and supplies the left image light beams and the right image light beams to the viewer. The viewer views a stereoscopic image.

FIG. 28 is a diagram showing the principle of a stereoscopic display capable of viewing a stereoscopic image without using special glasses using a parallax barrier. The stereoscopic display is constituted by a back light 1, a liquid crystal display panel 2, and a parallax barrier 3. In the liquid crystal display panel 2, vertical columns of left eye pixels L and vertical columns of right eye pixels R are alternately formed. In the parallax barrier 3, a lot of slits 3a and light shading portions 3b which extend in the vertical direction are alternately formed. There is sufficient binocular parallax for a human being to perceive a stereoscopic image between a left eye image composed of the left eye pixels L and a right eye image composed of the right eye pixels R.

In the stereoscopic display, when light beams emitted from the back light 1 pass through the liquid crystal display panel 2, the light beams passing through the left eye pixels L become left eye image light beams 4L upon being modulated by left eye image information, and the light beams passing through the right eye pixels R become right eye image light beams 4R upon being modulated by right eye image information. The left eye image light beams 4L and the right eye image light beams 4R reach the viewer upon being laterally separated by the parallax barrier 3. The viewer who desires to view a stereoscopic image puts his or her head in a predetermined position. The left eye image light beams 4L are incident on the left eye 5L of the viewer through the slits 3a. The right eye image light beams 4R are incident on the right eye 5R of the viewer through the slits 3a. Consequently, the viewer can recognize a stereoscopic image by the above-mentioned binocular parallax. The predetermined position where the viewer can recognize a stereoscopic image is taken as a stereoscopic view position. At this time, the right eye image light beams 4R are not incident on the left eye 5L of the viewer upon being intercepted by the light shading portions 3b. The left eye image light beams 4L are not either incident on the right eye 5R of the view upon being intercepted by the light shading portions 3b.

In the stereoscopic display, when the head of the viewer is positioned outside the stereoscopic view position, the right eye image light beams 4R are incident on the left eye 5L of the viewer, and the left eye image light beams 4L are incident on the right eye 5R of the viewer. Consequently, the viewer cannot recognize a good stereoscopic image. The above-mentioned position is taken as a pseudo-stereoscopic view position.

In order to enjoy a stereoscopic image, therefore, the viewer must first find out a stereoscopic view position where a good stereoscopic image can be viewed and fix his or her head in the position. When the head deviates from the stereoscopic view position while the stereoscopic image is being enjoyed, the head must be put in the stereoscopic view position again.

SUMMARY OF THE INVENTION

The present invention has been made in view of the disadvantages of the prior art and has for its first object to provide a stereoscopic display capable of easily finding out a stereoscopic view position where a good stereoscopic image can be viewed.

A second object of the present invention is to provide a stereoscopic display capable of easily finding out a stereoscopic view position even when a viewer deviates upward and downward and rightward and leftward, and upward and downward, rightward and leftward and backward and forward from the stereoscopic view position.

A third object of the present invention is to provide a stereoscopic display for guiding a viewer so that the stereoscopic view position can be easily found out.

In a stereoscopic display for separating light beams from a left eye image and a right eye image which are displayed on a display panel into left image light beams and right image light beams and supplying the left image light beams and the right image light beams to a viewer, a stereoscopic display according to the present invention is characterized by comprising stereoscopic view position teaching means comprising light emitting means for emitting a plurality of light beams, and a barrier plate arranged in front of the light emitting means on the side of the viewer and having a slit through which part of the light beams from the light emitting means are passed toward the viewer, wherein a first state of the light beams from the light emitting means which are incident on the left eye and the right eye of the viewer in a stereoscopic view position where a stereoscopic image can be viewed and a second state of the light beams from the light emitting means which are incident on the left eye and the right eye of the viewer in a position different from the stereoscopic view position are constructed to be different from each other.

Such construction allows the viewer to find out the stereoscopic view position by moving his or her own head so that the light beams incident from the light emitting means through the slit enter the first state.

The light emitting means may emit light beams in a first color and light beams in a second color which is different from the light beams in the first color. In this case, the first state is taken as a state where the light beams in the same color are incident on the left eye and the right eye, and the second state is taken as a state where the light beams in different colors are respectively incident on the left eye and the right eye. Consequently, the viewer can find out the stereoscopic view position by moving his or her head so that the light beams in the same color are incident on the left eye and the right eye.

When the light emitting means emits the light beams in the first color and the light beams in the second color, the first state is taken as a state where the light beams in different colors are respectively incident on the left eye and the right eye, and the second state is taken as a state where the light beams in the same color are incident on the left eye and the right eye. Consequently, the viewer can find out the stereoscopic view position by moving his or her head so that the light beams in different colors are respectively incident on the left eye and the right eye.

The light emitting means may emit light beams in a first outer shape and light beams in a second outer shape which is different from that of the light beams in the first outer shape. In this case, the first state is taken as a state where the light beams in the same outer shape are incident on the left eye and the right eye, and the second state is taken as a state where the light beams in different outer shapes are respectively incident on the left eye and the right eye. Consequently, the viewer can find out the stereoscopic view position by moving his or her head so that the light beams in the same outer shape are respectively incident on the left eye and the right eye.

When the light emitting means emits the light beams in the first outer shape and the light beams in the second outer shape, the first state is taken as a state where the light beams in different outer shapes are respectively incident on the left eye and the right eye, and the second state is taken as a state where the light beams in the same outer shape are incident on the left eye and the right eye. Consequently, the viewer can find out the stereoscopic view position by moving his or her head so that the light beams in different outer shapes are respectively incident on the left eye and the right eye. Further, the light beams in the first outer shape and the light beams in the second outer shape may have different colors.

The first state and the second state may differ in the vertical positions of the light emitting elements. Consequently, the viewer can find out the stereoscopic view position by moving his or her head so that the vertical positions of the light beams in the first state are seen. Further, the viewer can further recognize the difference between the light beams in the first state and the light beams in the second state.

The first state and the second state may differ in the number of the light emitting elements viewed by the viewer.

The light emitting means may be composed of a plurality of light emitting elements. In this case, the light emitting means may be so constructed as to satisfy the following equations (1) and (2), letting d be the distance from each of the light emitting elements to the barrier plate, P be a horizontal pitch between the light emitting elements, W1 be the horizontal width of each of the light emitting elements, W2 be the horizontal width of the slit of the barrier plate, D be the distance from the barrier plate to the light beam in the first state, A be the horizontal width of the light beam in the first state, and B be the horizontal width of the light beam in the second state:

$$d=D(W1+W2)/(A+B-W2) \quad (1)$$

$$P=(W1+W2)(A+B)/(A+B-W2) \quad (2)$$

The light emitting means may be so constructed as to satisfy the following equations (3) and (4), letting C be the horizontal width of the light beam in the second state, and E be the distance between the eyes of the viewer:

$$d=D(W1+W2)/(C+E-W2) \quad (3)$$

$$P=2E(W1+W2)/(C+E-W2) \quad (4)$$

The light emitting means is so constructed as to satisfy the following equations (5) and (6):

$$P=E(W1+W2)/(E-W2) \quad (5)$$

$$d=DP/E \quad (6)$$

In a stereoscopic display for separating light beams from a left eye image and a right eye image which are displayed on a display panel into left image light beams and right image light beams and supplying the left image light beams and the right image light beams to a viewer, a stereoscopic display according to the present invention is characterized by comprising stereoscopic view position teaching means comprising light emitting means for emitting a plurality of light beams, and a barrier plate arranged in front of the light emitting means on the side of the viewer and having a plurality of slits through which part of the light beams from the light emitting means are passed toward the viewer, wherein a first state of the light beams from the light emitting means which are incident on the left eye and the right eye of the viewer in a stereoscopic view position where a stereoscopic image can be viewed and a second state of the light beams from the light emitting means which are incident on the left eye and the right eye of the viewer in a position different from the stereoscopic view position are constructed to be different from each other.

The above-mentioned construction allows the viewer to find out the stereoscopic view position by moving his or her head so that the light beams incident from the light emitting means through the plurality of slits enter the first state.

Even in the above-mentioned construction comprising the barrier plate having the plurality of slits formed therein, the light emitting means may be constituted by a plurality of light emitting means.

In this case, the light emitting means may be so constructed as to satisfy the following equations (7) and (8):

$$P=2E(W1+W2)/(E-W2) \quad (7)$$

$$d=DP/2E \quad (8)$$

In a stereoscopic display for separating light beams from a left eye image and a right eye image which are displayed on a display panel into left image light beams and right image light beams and supplying the left image light beams and the right image light beams to a viewer, a stereoscopic display according to the present invention is characterized by comprising stereoscopic view position teaching means comprising light emitting means for emitting light beams, and light transmitting/shading means where a light shading portion and a light transmitting portion are so formed that the light beams from the light emitting means are viewed when the viewer deviates rightward and leftward, or rightward and leftward and upward and downward from a stereoscopic view position.

Such construction allows the viewer to notice, when the viewer deviates rightward and leftward from the stereoscopic view position, that he or she deviates because the light beams are seen, and to find out the stereoscopic view position by moving his or her head so that the light beams are not seen.

Furthermore, the viewer notices, when the viewer deviates not only rightward and leftward but also upward and downward from the stereoscopic view position, that he or she deviates because the light beams are seen, and finds out the stereoscopic view position by moving his or her head upward and downward and rightward and leftward so that the light beams are not seen.

In a stereoscopic display for separating light beams from a left eye image and a right eye image which are displayed on a display panel into left image light beams and right image light beams and supplying the left image light beams and the right image light beams to a viewer, a stereoscopic display according to the present invention is characterized by comprising two sets of stereoscopic view position teaching means each comprising light emitting means for emitting light beams, and light transmitting/shading means where a light shading portion and a light transmitting portion are so formed that the light beams from the light emitting means are viewed when the viewer deviates rightward and leftward, or rightward and leftward and upward and downward from a stereoscopic view position, the two sets of stereoscopic view position teaching means being arranged parallel to a display screen at a predetermined distance apart therefrom, and so formed that an approximately rhombic region where both the respective light beams from the two light emitting means are not seen corresponds to a stereoscopic view region.

Such construction allows the viewer to notice, when the viewer deviates not only rightward and leftward but also backward and forward from the stereoscopic view position, that he or she deviates because the light beams are seen, and to find out the stereoscopic view position by moving his or her head backward and forward and rightward and leftward, or backward and forward, upward and downward and rightward and leftward so that the light beams are not seen.

In a stereoscopic display for separating light beams from a left eye image and a right eye image which are displayed on a display panel into left image light beams and right image light beams and supplying the left image light beams and the right image light beams to a viewer, a stereoscopic display according to the present invention is characterized by comprising stereoscopic view position teaching means comprising light emitting means for emitting light beams, and light transmitting/shading means where a light shading portion and a light transmitting portion are so formed that the light beams from the light emitting means are not viewed when the viewer deviates rightward and leftward, or rightward and leftward and upward and downward from a stereoscopic view position.

Such construction allows the viewer to notice, when the viewer deviates rightward and leftward from the stereoscopic view position, that he or she deviates because the light beams are not seen, and to find out the stereoscopic view position by moving his or her head rightward and leftward so that the light beams are seen.

Such construction allows the viewer to notice, when the viewer deviates not only rightward and leftward but also upward and downward from the stereoscopic view position, that he or she deviates because the light beams are not seen, and to find out the stereoscopic view position by moving his or her head upward and downward and rightward and letftward so that the light beams are seen.

In a stereo scopic display for separating light beams from a left eye image and a right eye image which are displayed on a display panel into left image light beams and right image light beams and supplying the left image light beams and the right image light beams to a viewer, a stereoscopic display according to the present invention is characterized by comprising two sets of stereoscopic view position teaching means each comprising light emitting means for emitting light beams, and light transmitting/shading means where a light shading portion and a light transmitting portion are so formed that the light beams from the light emitting means are not viewed when the viewer deviates rightward and leftward, or rightward and leftward and upward and downward from a stereoscopic view position, wherein the two sets of stereoscopic view position teaching means are arranged to be parallel to a display screen at a predetermined distance apart therefrom and an approximately rhombic region where both the respective light beams from the two light emitting means are seen is formed corresponding to a stereoscopic view region.

Such construction allows the viewer to notice, when the viewer deviates not only rightward and leftward or rightward and leftward and upward and downward but also backward and forward from the stereoscopic view position, that he or she deviates because the light beams are not seen, and to find out the stereoscopic view position by moving his or her head backward and forward and rightward and leftward, or backward and forward, upward and downward and rightward and leftward so that the light beams are seen.

In a stereoscopic display for separating light beams from a left eye image and a right eye image which are displayed on a display panel into left image light beams and right image light beams, a stereoscopic display according to the present invention is characterized by comprising stereoscopic view position teaching means comprising light emitting means for emitting light beams using a part of a display screen of the display panel, and light transmitting/shading means where a light shading portion and a light transmitting portion are so formed, using a constructed body for separating a light beam from a left eye image and a light beam from a right eye image to rightward and leftward, that the light beams from the light emitting means are seen when the viewer deviates rightward and leftward, or upward and downward and rightward and leftward from a stereoscopic view position.

Such construction has the advantage that the number of parts is not increased, as compared with such construction that a light emitting element, for example, is used as the light emitting means, and a slit plate, for example, is used as the light transmitting/shading means, and also has the advantage that the stereoscopic view position teaching means does not need to be aligned with the display screen because it is constructed integrally with the stereoscopic display.

The stereoscopic view position teaching means may be so constructed that the viewer in a position different from the stereoscopic view position can view an arrow indicating direction of the stereoscopic view position. The arrow is displayed on the display screen, so that the viewer can easily know the stereoscopic view position by seeing the arrow.

In a stereoscopic display for separating light beams from a left eye image and a right eye image which are displayed on a display panel into left image light beams and right image light beams, a stereoscopic display according to the present invention is characterized by comprising stereoscopic view position teaching means comprising light emitting means for emitting light beams, a condenser lens provided in front of the light emitting means on the side of the viewer for collecting the light beams from the light emitting means and introducing the light beams into the left eye and the right eye of the viewer, and a transparent sheet interposed between the light emitting means and the condenser lens and having patterns of a stereoscopic image so formed thereon that the patterns which can be viewed by the viewer in a stereoscopic view position and the patterns which can be viewed by the viewer in a position different from the stereoscopic view position differ from each other.

The above-mentioned construction allows the viewer to easily find out the stereoscopic view position by seeing the patterns which can be viewed in the stereoscopic view position. Further, the viewer views the patterns using the condenser lens. Even when the viewer deviates not only upward and downward and rightward and leftward but also backward and forward from the stereoscopic view position, it is possible to make the viewer have an uncomfortable feeling and notice that the position of the viewer is not the stereoscopic view position. The viewer can easily find out the stereoscopic view position by so moving that the patterns which can be viewed in the normal viewing position can be viewed without any uncomfortable feeling.

The transparent sheet may be so constructed that the patterns are so formed that an arrow pointing toward the stereoscopic view position can be viewed when the viewer deviates rightward and leftward and upward and downward from the stereoscopic view position. By thus forming the patterns, the viewer can easily find out the stereoscopic view position by moving upon seeing the arrow.

The transparent sheet may be so constructed that the patterns are so formed that the patterns which can be respectively viewed by the viewer in a plurality of stereoscopic view positions are the same.

The transparent sheet may be so constructed that the patterns which can be viewed are changed as the viewer moves. Specifically, the transparent sheet may be so constructed that the patterns are so formed as to be changed in accordance with the distance the viewer moves. Further, the transparent sheet may be so constructed that the patterns are so formed as to be changed when the viewer moves a predetermined distance. Consequently, the viewer can easily grasp the stereoscopic view position.

As described in the foregoing, according to the present invention, it is possible to easily find out a stereoscopic view position where a good stereoscopic image can be viewed. For example, the viewer can easily find out the stereoscopic view position by only moving his or her head so that the color, the shape, the position, or the number of the light emitting elements which are incident on the left eye and the right eye through the slit of the barrier plate enter the first state. That is, the viewer can immediately enjoy the stereoscopic image even by moving the head when the stereoscopic image is first viewed or while it is viewed. The stereoscopic view position can be also easily found out with respect to not only a rightward and leftward deviation but also an upward and downward and backward and forward deviation. Further, when the stereoscopic view position teaching means is constructed using a part of the display screen, the necessity of reducing and adjusting the number of parts can be eliminated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6A is a plan view showing the relationship between light beams from light emitting diodes and the position where a stereoscopic image is viewed in a stereoscopic display according to a fourth embodiment of the present invention, FIG. 6B is an explanatory view showing a combination of the colors and the outer shapes of the light emitting diodes shown in FIG. 6A, and FIG. 6C is a schematic view showing the arrangement of the light emitting diodes shown in FIG. 6A;

FIG. 7A is a plan view showing the relationship between light beams from light emitting diodes and the position where a stereoscopic image is viewed in a stereoscopic display according to a fifth embodiment of the present invention, FIG. 7B is an explanatory view showing a combination of the colors and the outer shapes of the light emitting diodes shown in FIG. 7A, and FIG. 7C is a schematic view showing the arrangement of the light emitting diodes shown in FIG. 7A;

DESCRIPTION OF THE PREFERRED EMBODIMENTS

Figure 1:
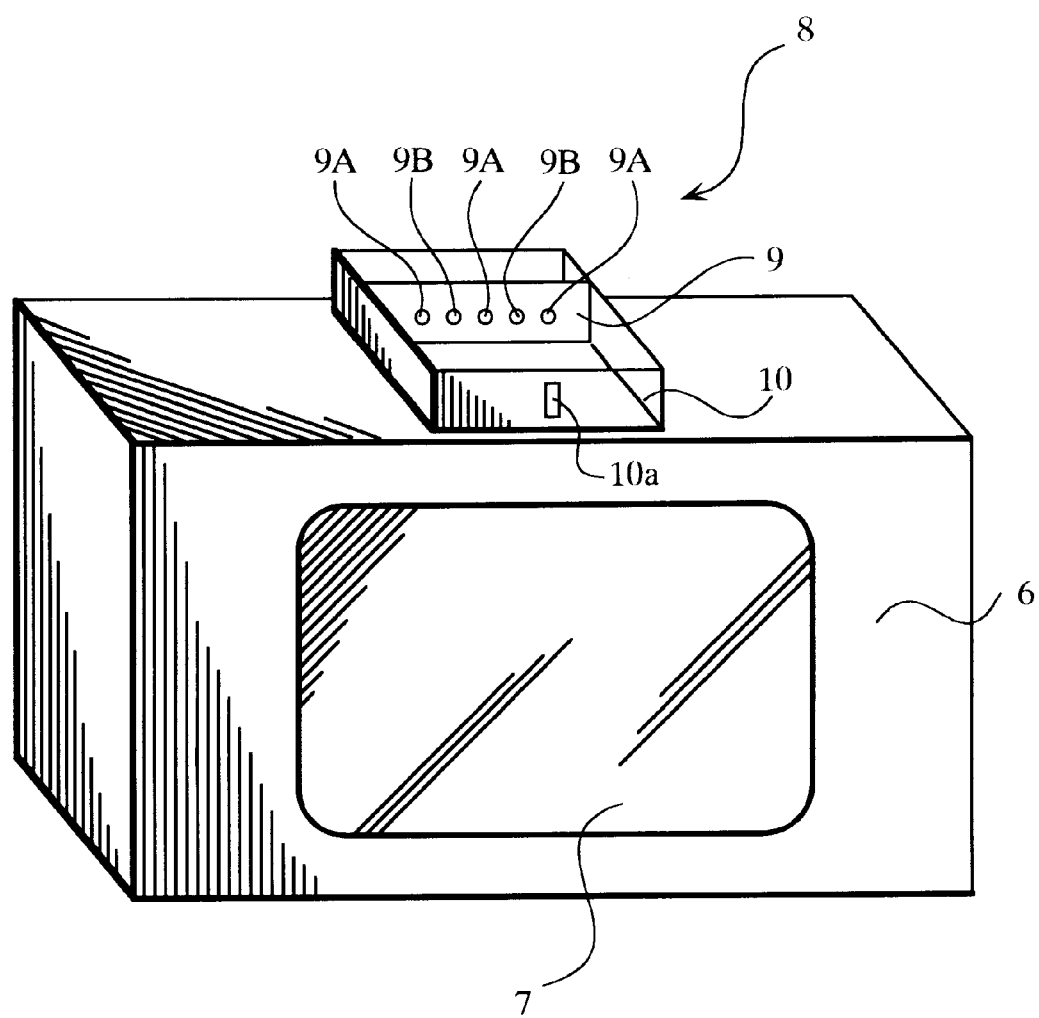
FIG. 1 is a perspective view showing the appearance of a stereoscopic display according to a first embodiment of the present invention.

Embodiments of the present invention will be described in detail while referring to the drawings.

(First Embodiment)

FIG. 1 is a perspective view showing the appearance of a stereoscopic display according to a first embodiment of the present invention.

Figure 28:
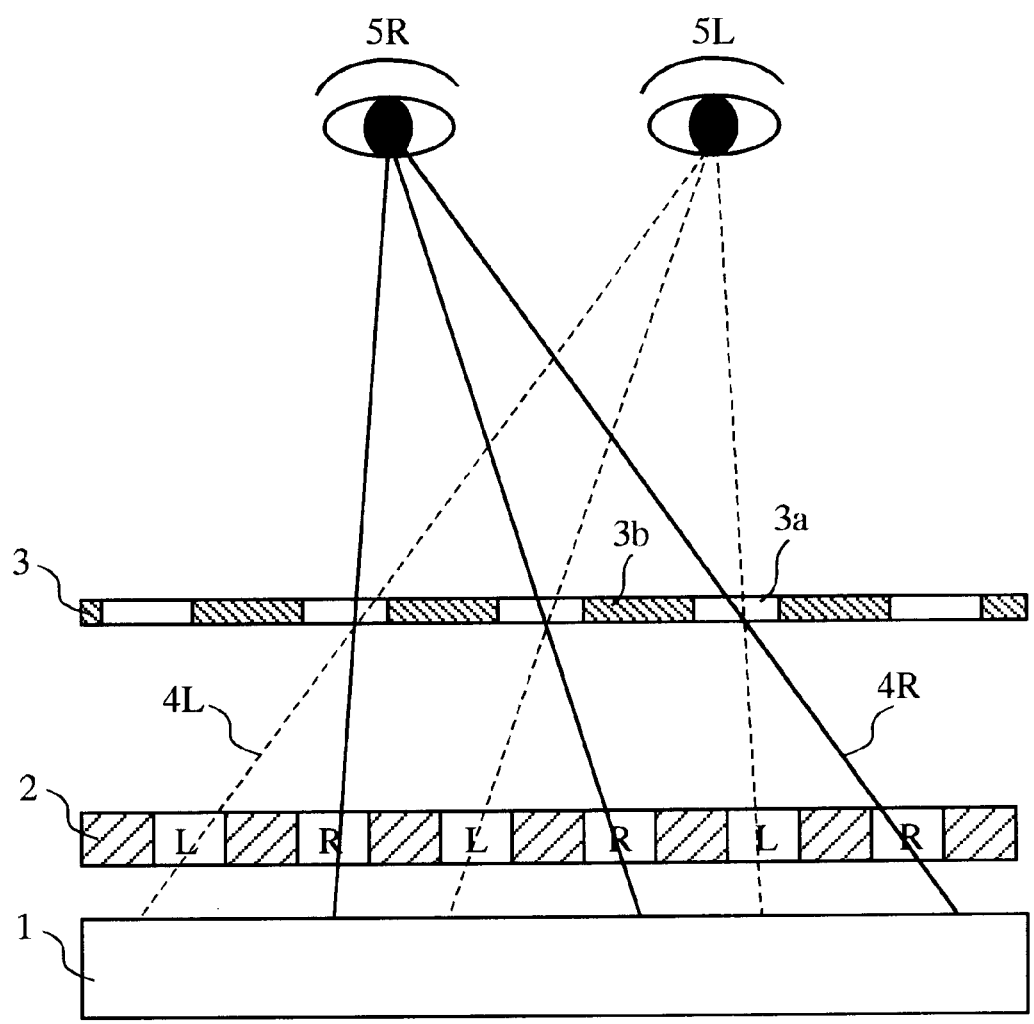
FIG. 28 is a plan view showing the principle of a stereoscopic display without glasses using a parallax barrier in the prior art.

In the stereoscopic display according to the present embodiment, a display screen 7 on which a stereoscopic image is displayed is formed on a front surface of a case 6. A stereoscopic view position detecting unit 8 which is stereoscopic view position teaching means is formed on the upper surface of the case 6. The display screen 7 is a stereoscopic image display which is constituted by a back light 1, a liquid crystal display panel 2, and a parallax barrier 3, as shown in FIG. 28 used in the prior art.

Figure 3:
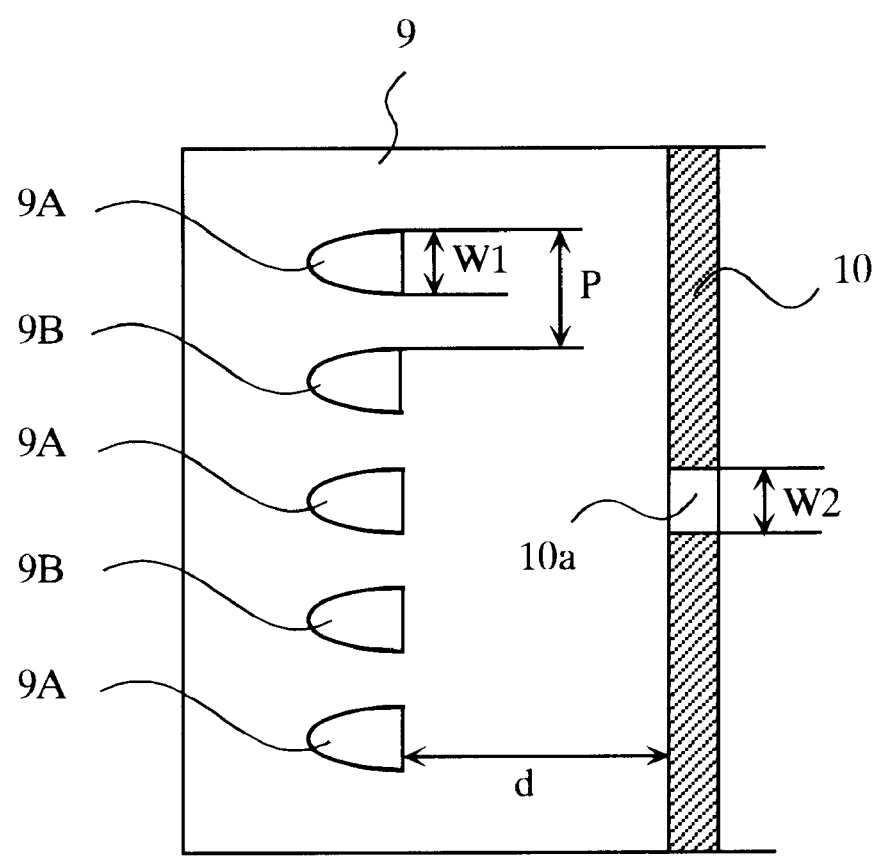
FIG. 3 is a plan view showing the construction of a stereoscopic view position detecting unit in the stereoscopic display according to the first embodiment of the present invention.

The stereoscopic view position detecting unit 8 is constituted by a light emitting unit 9 which is light emitting means and a barrier plate 10. The barrier plate 10 is arranged parallel to the display screen in front of the light emitting unit 9 (on the side of a viewer). A longitudinal slit 10a is formed in the center of the barrier plate 10. In the light emitting unit 9, green light emitting diodes 9A for emitting green light beams forward and red light emitting diodes 9B for emitting red light beams forward are so constructed as to be alternately arranged in a direction along the display screen 7, as shown in a top view of FIG. 3. The green light emitting diode 9A and the red light emitting diode 9B are entirely the same in dimensions, for example, except for the color of the emitted light beams.

The positional relationship between each of the light emitting diodes 9A and 9B in the light emitting unit 9 and the slit 10a of the barrier plate 10 and the respective dimensions are so formed as to satisfy the relationship indicated by the following equations (1) and (2):

$$d = D(W1+W2)/(A+B-W2) \quad (1)$$

$$P = (W1+W2)(A+B)/(A+B-W2) \quad (2)$$

In this case, let d be the distance from each of the light emitting diodes to the barrier plate, P be a horizontal pitch representing positional spacing between the light emitting diodes, W1 be the horizontal width of the light emitting diode, W2 be the horizontal width of the slit of the barrier plate, D be the distance from the barrier plate to the stereoscopic view position (a proper viewing distance), A be the horizontal width of the stereoscopic view position, and B be the horizontal width of a pseudo-stereoscopic view position. The width A of the stereoscopic view position and the width B of the pseudo-stereoscopic view position are determined by the width of pixels on the liquid crystal display panel 2 constituting the display screen 7, for example.

Figure 2:
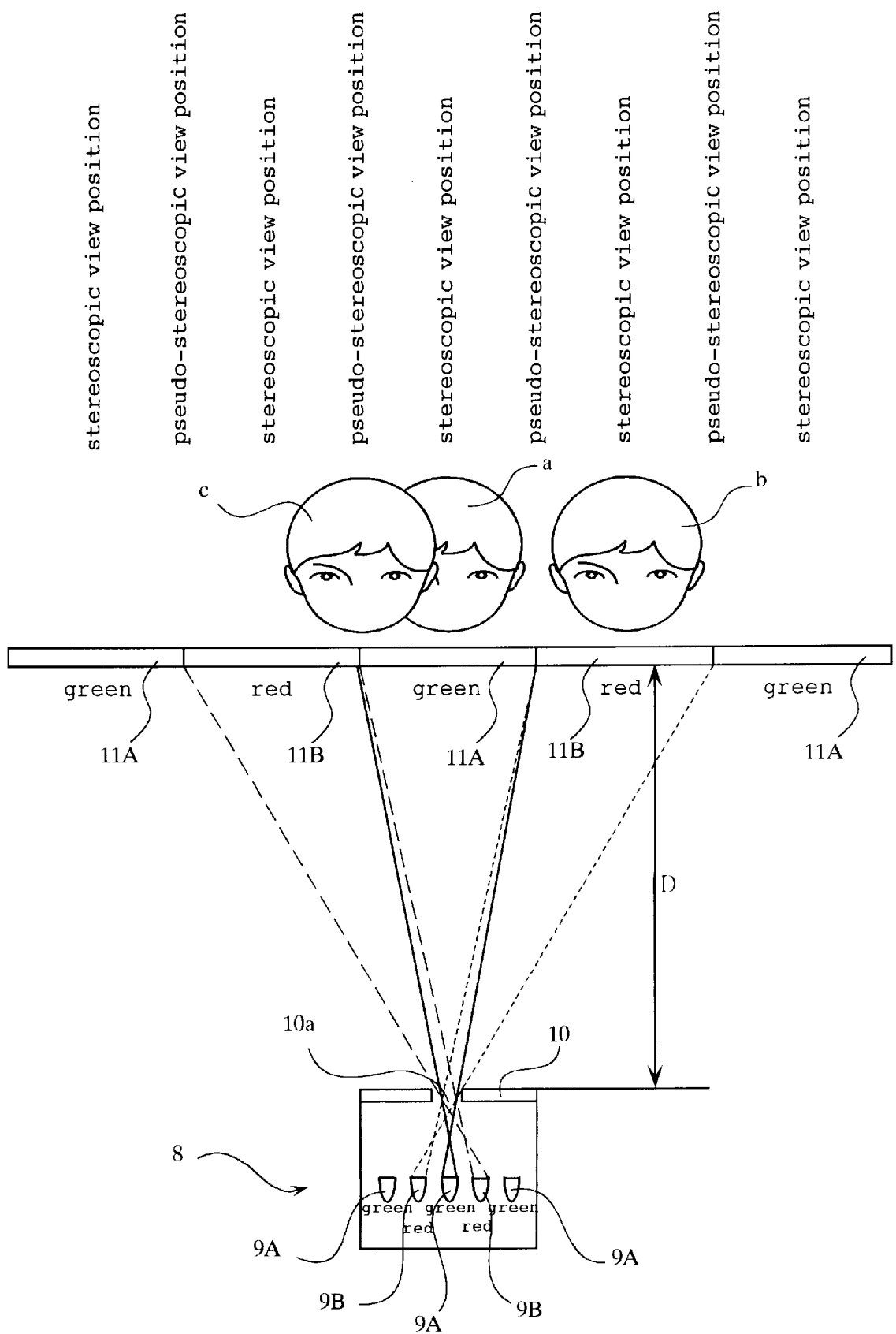
FIG. 2 is a plan view showing the relationship between light beams from light emitting diodes and the position where a stereoscopic image is viewed in the stereoscopic display according to the first embodiment of the present invention.

The light beams in each of the colors emitted from the light emitting diodes 9A and 9B in the stereoscopic view position detecting unit 8 of the above-mentioned construction are directed toward the viewer through the slit 10a of the barrier plate 10, as shown in FIG. 2. Green regions 11A on which only the green light beams are incident and red regions 11B on which only the red light beams are incident are formed in a position, where a stereoscopic image reflected on the display screen 7 is seen most satisfactorily, spaced a predetermined distance (a proper viewing distance) apart from the display screen 7.

Description is made of the relationship of the green regions 11A and the red regions 11B to the stereoscopic view position where a good stereoscopic image is seen and the pseudo-stereoscopic view position where a good stereoscopic image is not seen. As shown in FIG. 2, when the viewer is positioned in the stereoscopic view position, both the right and left eyes are positioned in the green region 11A as in a viewer a, or both the right and left eyes are positioned in the red region 11B as in a viewer b. When the viewer is positioned in the pseudo-stereoscopic view position, the left eye is positioned in the green region 11A and the right eye is positioned in the red region 11B as in a viewer c, or the right eye is positioned in the green region 11A and the left eye is positioned in the red region 11B, which is not illustrated.

Consequently, light beams in the same color are incident on the right and left eyes of the viewer positioned in the stereoscopic view position. Light beams in different colors are respectively incident on the right and left eyes of the viewer positioned in the pseudo-stereoscopic view position.

As described in the foregoing, in the stereoscopic display according to the above-mentioned embodiment, the viewer can easily find out the stereoscopic view position where a good stereoscopic image can be viewed only by moving his or her head so that light beams in the same color are seen from the slit 10a of the barrier plate 10 in the stereoscopic view position detecting unit 8 with both the right and left eyes.

Although in the above-mentioned embodiment, the stereoscopic display is so constructed that the position where light beams in the same color are incident on the right and left eyes of the viewer is the stereoscopic view position, it may be so constructed that the position where light beams in different colors are respectively incident on the right and left eyes is the stereoscopic view position.

(Second Embodiment)

Figure 4:
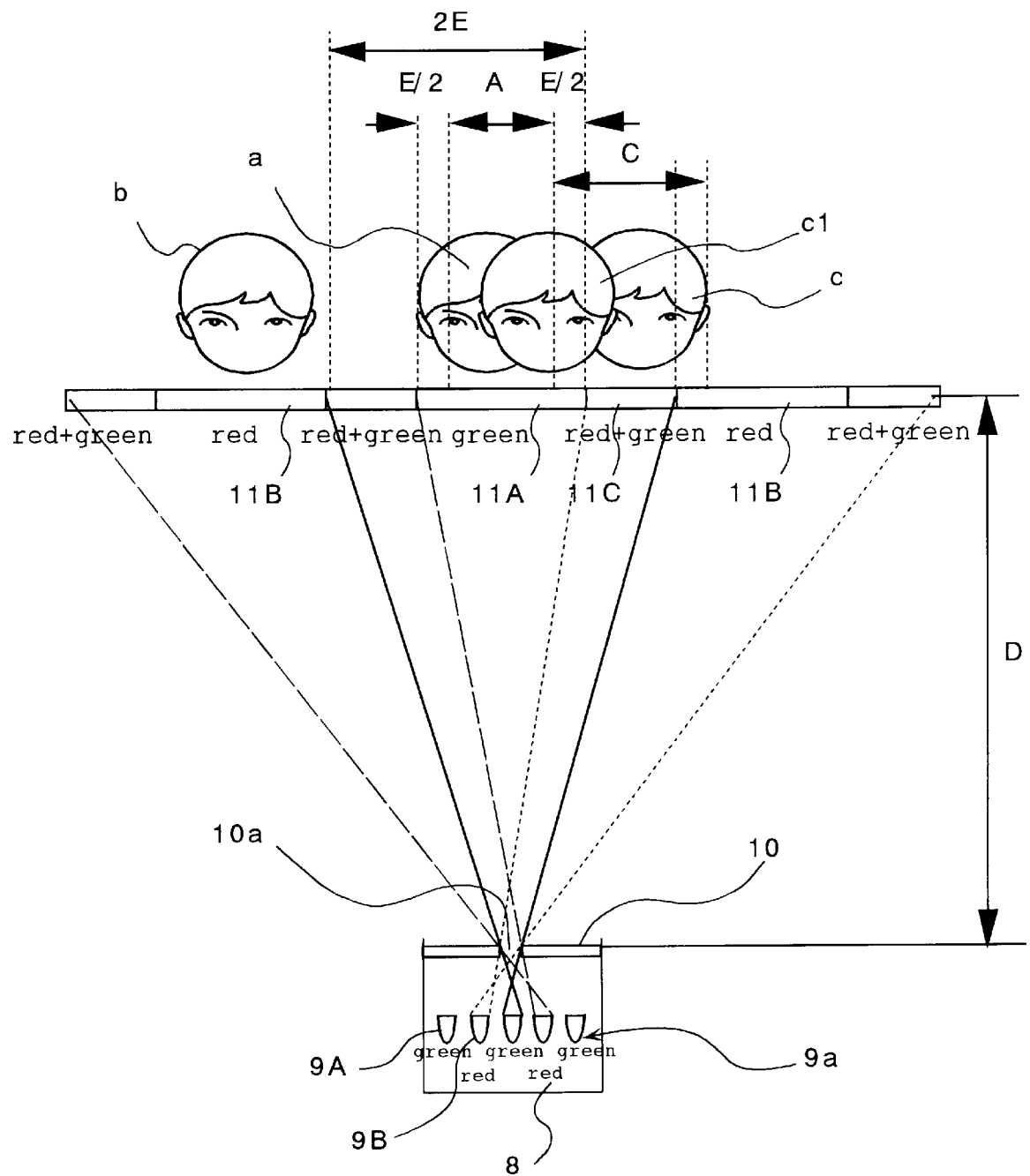
FIG. 4 is a plan view showing the relationship between light beams from light emitting diodes and the position where a stereoscopic image is viewed in a stereoscopic display according to a second embodiment of the present invention.

FIG. 4 is a schematic view showing the relationship between light beams from light emitting diodes and the position where a stereoscopic image is viewed in a stereoscopic display according to a second embodiment. A light emitting unit 9a in the second embodiment is a modification of the light emitting unit 9 in the stereoscopic view position detecting unit 8 in the first embodiment. The same constituent elements as those shown in FIG. 2 are assigned the same reference numerals and hence, the description thereof is not repeated. Spacing (a horizontal pitch) between the light emitting diodes, the distance between each of light emitting diodes 9A and 9B in the light emitting unit 9a and a slit 10a of a barrier plate 10 is so set as to satisfy the relationship indicated by the following equations (3) and (4):

$$d = D(W1+W2)/(C+E-W2) \quad (3)$$

$$P = 2E(W1+W2)/(C+E-W2) \quad (4)$$

In this case, let C be the width of a position, which is composed of a crosstalk and moire region and a reversed view region, other than a stereoscopic view position, and E be the distance between the eyes of a viewer. The width A of the stereoscopic view position and the width C of the position, which is composed of the crosstalk and moire region and the reversed view region, other than the stereoscopic view position are determined by the width of pixels on a liquid crystal display panel 2 constituting a display screen 7, for example.

Light beams in each of colors emitted from the light emitting diodes 9A and 9B in the stereoscopic view position detecting unit 8 of the above-mentioned construction are directed toward the viewer through the slit 10a of the barrier plate 10, as shown in FIG. 4. Green regions 11A on which only green light beams are incident, red regions 11B on which only red light beams are incident, and a color mixture region 11C on which both the green light beams and the red light beams are incident are formed in a position, where a stereoscopic image reflected on the display screen 7 is most satisfactorily seen, spaced a predetermined distance (a proper viewing distance) apart from the display screen 7.

Description is made of the relationship of the green regions 11A, the red regions 11B and the color mixture regions 11C to the stereoscopic view position where a good stereoscopic image is seen and a position other than the stereoscopic view position where a good stereoscopic image is not seen. As shown in FIG. 4, when the viewer is in the stereoscopic view position, both the right and left eyes are positioned in the green region 11A as in a viewer a, or both the right and left eyes are positioned in the red region 11B as in a viewer b. On the other hand, when the viewer is positioned in a position, where a good stereoscopic image is not seen, other than the stereoscopic view position, both the right and left eyes are positioned in the region where both the light beams are viewed as in a viewer c. The position of a viewer c1 is a position in the boundary between the stereoscopic view position and the position where a good stereoscopic image is not seen.

Consequently, the viewer positioned in the stereoscopic view position can only see light beams in either one of the colors. Further, the viewer in a position, where a good stereoscopic image is not seen, other than the stereoscopic view position can see light beams in both the colors.

As described in the foregoing, in the streoscopic display according to the above-mentioned embodiment, the viewer can easily find out the stereoscopic view position where a good stereoscopic image can be viewed only by moving his or her head so that light beams in the same color are seen from the slit 10a of the barrier plate 10 in the stereoscopic view positiion detecting unit 8 with the right and left eyes.

(Third Embodiment)

Figure 5A:
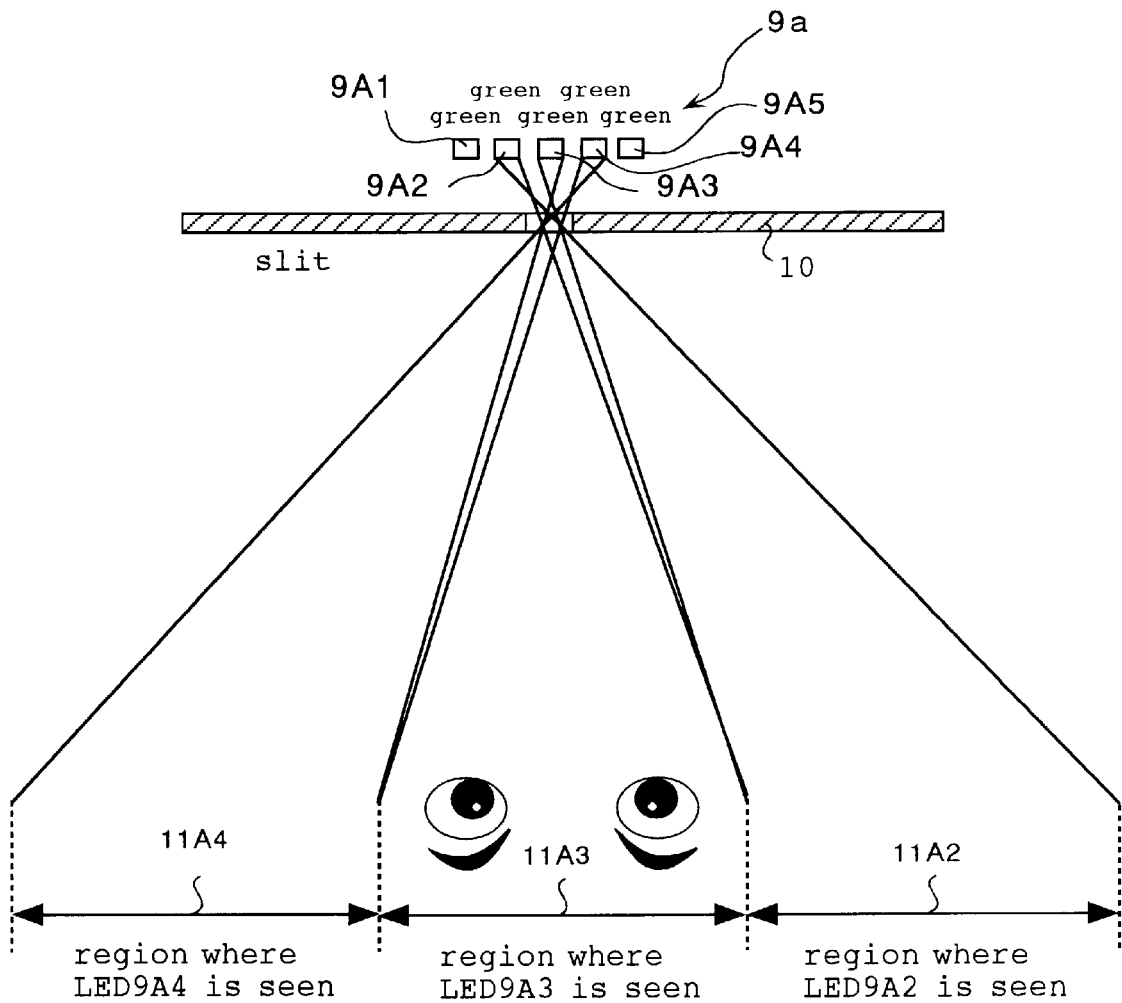
FIG. 5A is a plan view showing the relationship between light beams from light emitting diodes and the position where a stereoscopic image is viewed in a stereoscopic display according to a third embodiment of the present invention.

FIG. 5A is a schematic view showing the relationship between light beams from light emitting diodes and the position where a stereoscopic image is viewed in a stereoscopic display according to a third embodiment. A light emitting unit 9a in the stereoscopic display according to the third embodiment is constructed using green light emitting diodes 9A in place of the red light emitting diodes 9B used in the light emitting unit 9 in the stereoscopic view position detecting unit 8 in the first embodiment and using the light emitting diodes 9A1, 9A2, 9A3, 9A4, and 9A5 which are all green. Consequently, spacing (a horizontal pitch) between the light emitting diodes 9A1 to 9A5 in the light emitting unit 9a and the distance between each of the light emitting diodes 9A1 to 9A5 and a slit 10a of a barrier plate 10 is so set as to satisfy the relationship indicated by the foregoing equation (1).

Light beams from each of the light emitting diodes 9A1 to 9A5 emitted from the light emitting unit 9a are directed toward a viewer through the slit 10a of the barrier plate 10, as shown in FIG. 2 or 5. Regions 11A1 to 11A5 on which the light beams from the light emitting diodes 9A1 to 9A5 are respectively irradiated are formed in a position, where a stereoscopic image reflected on a display screen 7 is most satisfactorily seen, spaced only a predetermined distance (a proper viewing distance) apart from the display screen 7. For example, as shown in FIG. 5A, the light beams from the light emitting diode 9A3 are irradiated onto the region 11A3, and the light beams from the light emitting diode 9A2 are irradiated onto the region 11A2.

Description is made of the relationship between each of the regions 11A1 to 11A5 onto which the light beams from the light emitting diodes 9A1 to 9A5 are irradiated and a stereoscopic view position where a good stereoscopic image is seen and a pseudo-stereoscopic view position where a good stereoscopic image is not seen. As shown in FIG. 5A, in a case where the viewer is positioned in the stereoscopic view position, both the right and left eyes are positioned in one region. On the contrary, in a case where the viewer is positioned in the pseudo-stereoscopic view position, the right and left eyes are respectively positioned in different regions.

Consequently, only one light beam is incident on the right and left eyes of the viewer positioned in the stereoscopic view position, and two light beams are incident on the right and left eyes of the viewer positioned in the pseudo-stereoscopic view position.

As described in the foregoing, in the stereoscopic display according to the above-mentioned embodiment, the viewer can easily find out the stereoscopic view position where a good stereoscopic image can be viewed only by moving his or her head so that light beams from the slit 10a of the barrier plate 10 are seen as one light.

Figure 5B:
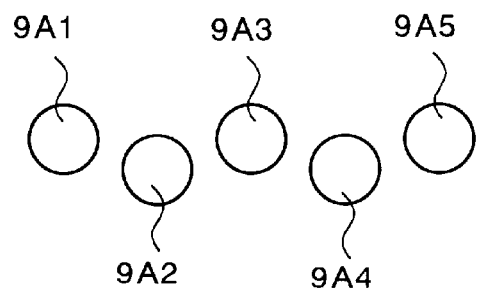
FIG. 5B is a schematic view showing the arrangement of the light emitting diodes shown in FIG. 5A.

The above-mentioned light emitting diodes 9A1 to 9A5 are all green, and are linearly arranged. In order to distinguish between the stereoscopic view position where one light beam is seen and the pseudo-stereoscopic view position where two light beams are seen, however, the light emitting diodes 9A1 to 9A5 may be so arranged that the positions thereof respectively deviate upward and downward, as shown in FIG. 5B. Such an arrangement allows the viewer to clearly see two light beams in the pseudo-stereoscopic view position.

(Fourth Embodiment)

FIG. 6A is a schematic view showing the relationship between light beams from light emitting diodes and the position where a stereoscopic image is viewed in a stereoscopic display according to a fourth embodiment. In the first embodiment, the viewer sees one light beam in the same color in a stereoscopic view position, while seeing two light beams in different colors in a pseudo-stereoscopic view position. On the other hand, in the present embodiment, the viewer sees two light beams in the same color in a stereoscopic view position, while seeing two light beams in different colors in a pseudo-stereoscopic view position. Consequently, each of light emitting diodes in a light emitting unit 109 in a stereoscopic view position detecting unit is so constructed that two red light emitting diodes 109A1 and 109A2, two green light emitting diodes 109B3 and 109B4, and two red light emitting diodes 109A5 and 109A6 are successively arranged, as shown in FIG. 6A.

The distance between each of the light emitting diodes 109A1, 109A2, 109A5, 109A6, 109B3, and 109B4 and a slit 110a of a barrier plate 110 satisfies the relationship indicated by the following equations (5) and (6):

$$P=E(W1+W2)/(E-W2) \quad (5)$$

$$d=DP/E \quad (6)$$

By the above-mentioned construction, each of light beams emitted from the light emitting diodes 109A1, 109A2, 109A5, 109A6, 109B3, and 109B4 in the light emitting unit 109 is directed toward the viewer through the slit 10a of the barrier plate 10. In a position, where a stereoscopic image is most satisfactorily seen, spaced a predetermined distance (a proper viewing distance) apart from a display screen 7, red regions 111A1, 111A2, 111A5, and 111A6 and green regions 111B3 and 111B4 on which the light beams from the light emitting diodes 109A1, 109A2, 109A5, 109A6, 109B3, and 109B4 are respectively incident are formed, as shown in FIG. 6A.

Description is now made of the relationship of the red regions 111A1, 111A2, 111A5 and 111A6 and the green regions 111B3 and 111B4 to the stereoscopic view position where a good stereoscopic image is seen and the pseudo-stereoscopic view position where a good stereoscopic image is not seen. As shown in FIG. 6A, when the viewer is positioned in the stereoscopic view position, the right eye is positioned in the green region 111B3, and the left eye is positioned in the green region 111B4, or the right eye is positioned in the red region 111A1 or 111A5, and the left eye is positioned in the red region 111A2 or 111A6. On the other hand, when the viewer is positioned in the pseudo-stereoscopic view position, the right eye is positioned in the green region 111B4, and the left eye is positioned in the red region 111A5, or the right eye is positioned in the red region 111A2, and the left eye is positioned in the green region 111B3.

Consequently, two light beams in the same color are incident on the right and left eyes of the viewer positioned in the stereoscopic view position. Two light beams in different colors are incident on the right and left eyes of the viewer positioned in the pseudo-stereoscopic view position.

As described in the foregoing, in the stereoscopic display according to the present embodiment, the viewer can easily find out the stereoscopic view position where a good stereoscopic image can be viewed only by moving his or her head so that two light beams in the same color are seen from the slit 110a of the barrier plate 110.

Although in the above-mentioned fourth embodiment, description was made using the red light emitting diodes and the green light emitting diodes, as shown in FIG. 6B, the outer shapes of the light beams viewed by the viewer may be changed instead of changing the colors of the light beams. Further, the light emitting diodes may be so arranged as to deviate upward and downward, with the two light emitting diodes in the same color used as a set, for each set as shown in FIG. 6C, instead of changing the colors and the outer shapes of the light beams.

Although in the above-mentioned embodiment, the stereoscopic display is so constructed that the position where the two light beams in the same color are incident on the right and left eyes of the viewer is the stereoscopic view position, it may be so constructed that the position where the two light beams in different colors are incident on the right and left eyes is the stereoscopic view position. Further, it may be so constructed that the position where the two light beams having different outer shapes are incident on the right and left eyes is the stereoscopic view position.

(Fifth Embodiment)

FIG. 7A is a schematic view showing the relationship between light beams from light emitting diodes and the position where a stereoscopic image is viewed in a stereoscopic display according to a fifth embodiment. Although in the first embodiment, the barrier plate 10 is provided with one slit 10a, a barrier plate 210 is provided with two slits 210a and 210b, and stereoscopic view position detecting units 208a and 208b are independently provided in the fifth embodiment. A red light emitting diode 209A1, a green light emitting diode 209B3, and a red light emitting diode 209A5 are formed on the side of the slit 210a. A red light emitting diode 209A2, a green light emitting diode 209B4, and a red light emitting diode 209A6 are formed on the side of the slit 210b. The stereoscopic view position detecting units 208a and 208b can be respectively set in conformity to the positions of the slits 210a and 210b.

The positional relationship of the red light emitting diodes 209A1 and 209A5 and the green light emitting diode 209B3 to the slit 210a of the barrier plate 210 and the respective dimensions are so set as to satisfy the relationship indicated by the following equations (7) and (8):

$$P=2E(W1+W2)/(E-W2) \quad (7)$$

$$d=DP/2E \quad (8)$$

The positional relationship of the red light emitting diodes 209A2 and 209A6 and the green light emitting diode 209B4 to the slit 210*b* of the barrier plate 210 and the respective dimensions are similarly set.

By the above-mentioned construction, light beams emitted from each of the light emitting diodes 209A1, 209B3, and 209A5 pass through the slit 210*a* of the barrier plate 210. Light beams emitted from each of the light emitting diodes 209A2, 209B4, and 209A6 pass through the slit 210*b* of the barrier plate 210. In a position spaced a predetermined distance (a proper viewing distance) apart from a display screen 7 where a stereoscopic image is most satisfactorily seen, red regions 211A1, 211A2, 211A5, and 211A6, and green regions 211B3 and 211B4 on which the light beams from the light emitting diodes 209A1, 209A2, 209A5, 209A6, 209B3, and 209B4 are respectively incident are formed, as shown in FIG. 7A.

Description is made of the relationship of the red regions 211A1, 211A2, 211A5, and 211A6 and the green regions 211B3 and 211B4 to a stereoscopic view position where a good stereoscopic image is seen and a pseudo-stereoscopic view position where a good stereoscopic image is not seen. As shown in FIG. 7A, when the viewer is positioned in the stereoscopic view position, the right eye is positioned in the green region 211B3 and the left eye is positioned in the green region 211B4, or the right eye is positioned in the red regions 211A1 and 211A5 and the left eye is positioned in the red regions 211A2 and 211A6. On the contrary, when the viewer is positioned in the pseudo-stereoscopic view position, the right eye is positioned in the green region 211B4 and the left eye is positioned in the red region 211A5, or the right eye is positioned in the red region 211A2 and the left eye is positioned in the green region 211B3.

Consequently, two light beams in the same color are incident on the right and left eyes of the viewer positioned in the stereoscopic view position, and two light beams in different colors are respectively incident on the right and left eyes of the viewer positioned in the pseudo-stereoscopic view position. In this case, the viewer feels as if a light source existed on a surface S.

As described in the foregoing, in the stereoscopic display according to the above-mentioned embodiment, the viewer can easily find out the stereoscopic view position where a good stereoscopic image can be viewed only by moving his or her head so that light beams in the same color are seen from the slits 210*a* and 210*b* of the barrier plate 210.

Although in the above-mentioned fourth embodiment, description was made using the red light emitting diodes and the green light emitting diodes, the outer shapes of the light beams may be changed instead of changing the colors of the light beams, as shown in FIG. 7B. Further, the two light emitting diodes 209A1 and 209A2, the light emitting diodes 209B3 and 209B4, and the light emitting diodes 209A5 and 209A6 may be respectively used as sets, and the light emitting diodes are arranged upon deviating upward and downward for each set, as shown in FIG. 7C, instead of changing the colors and the outer shapes of the light beams. The stereoscopic view position detecting units 208*a* and 208*b* may be so constructed that the viewer sees one light beam in the stereoscopic view position, while seeing two light beams in the pseudo-stereoscopic view position.

(Sixth Embodiment)

Figure 8:
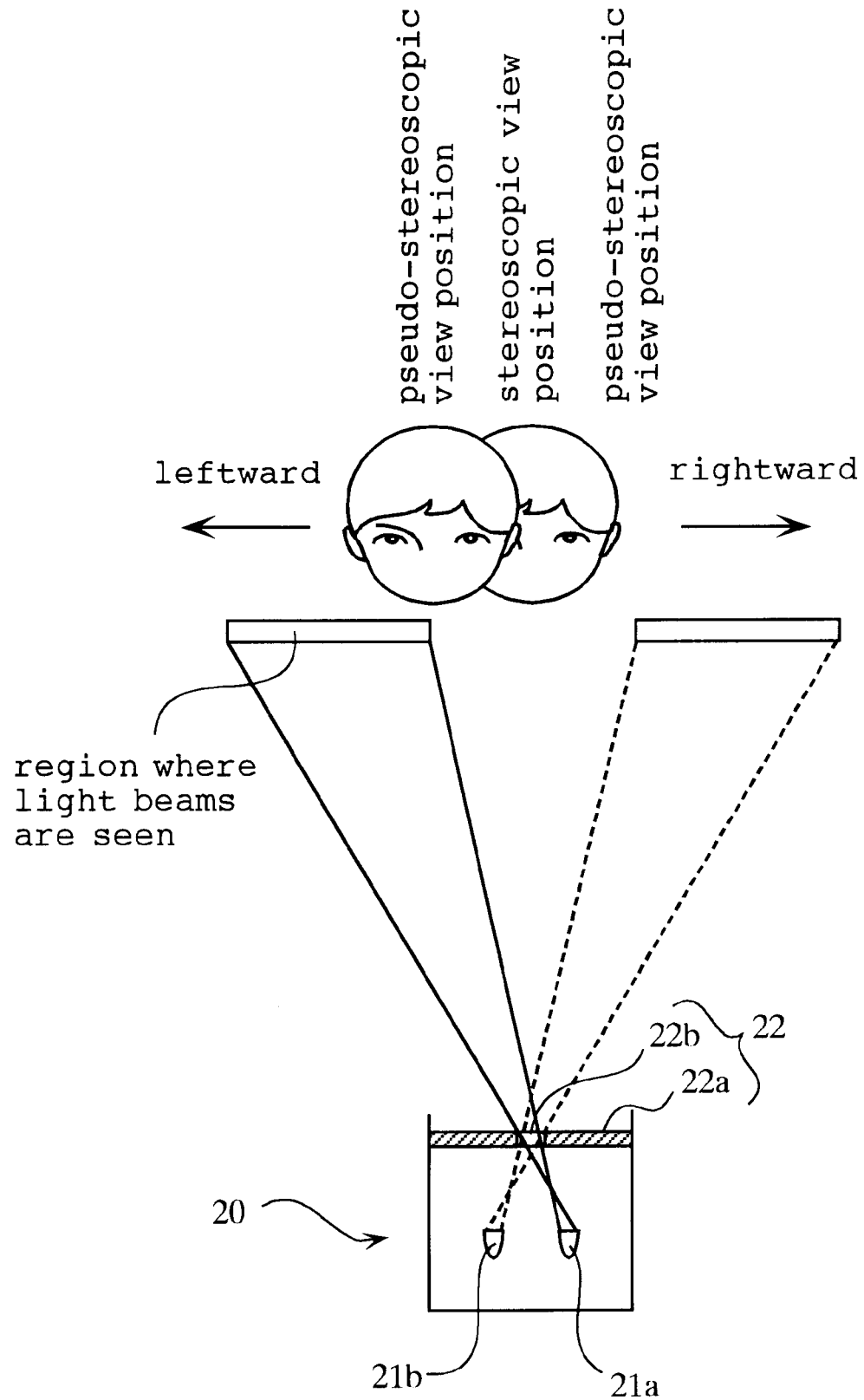
FIG. 8 is a plan view showing the relationship between stereoscopic view position teaching means and a viewer in a sixth embodiment of the present invention.

A sixth embodiment of the present invention will be described on the basis of FIG. 8. FIG. 8 is a plan view showing a stereoscopic display according to the present embodiment. For convenience of illustration, FIG. 8 does not illustrate the appearance of the stereoscopic display, but illustrates the relationship between stereoscopic view position teaching means 20 arranged on the upper surface of the stereoscopic display and a viewer.

The stereoscopic view position teaching means 20 comprises two light emitting diodes 21*a* and 21*b* emitting colorless light beams or light beams in a predetermined color, and light transmitting/shading means 22 having a light shading portion 22*a* and a longitudinal slit-shaped light transmitting portion 22*b* so formed therein that the light beams from the light emitting diode 21*a* or the light emitting diode 21*b* can be seen when the viewer is positioned in a pseudo-stereoscopic view position upon deviating rightward or leftward from a stereoscopic view position. The positional relationship between each of the light emitting diodes 21*a* and 21*b* and the slit-shaped light transmitting portion 22*b* and the respective dimensions may satisfy the positional relationship and dimensions corresponding to the horizontal width of each of the red light emitting diodes 9B, the horizontal pitch between the red light emitting diodes, the horizontal width of the slit 10*a*, the distance from a light emitting surface of the light emitting diode to the slit 10*a*, for example, as shown in the first embodiment.

Such construction allows the viewer to notice, when the viewer deviates leftward from the stereoscopic view position, that he or she deviates because the light beams from the light emitting diode 21*a* are seen with the right eye, while noticing, when the viewer deviates rightward from the stereoscopic view position, that he or she deviates because the light beams from a light emitting diode 21*b* are seen with the left eye. The viewer can find out the stereoscopic view position by moving his or her head rightward and leftward so that the light beams are not seen.

In the construction shown in FIG. 8, a stereoscopic image is normally viewed also in the position where light beams are incident on both the eyes of the viewer. However, stereoscopic view is possible most suitably in the position of a front surface of the stereoscopic display. According to the present embodiment, therefore, it is most desirable that the position where the light beams from the light emitting diodes 21*a* and 21*b* are not seen is taken as the position of the front surface of the stereoscopic display, and the viewer is made to enjoy an image in this position. The viewer can easily know whether the viewer deviates rightward or leftward by making the colors of the light beams emitted from the light emitting diodes 21*a* and 21*b* different from each other.

(Seventh Embodiment)

Figure 9:
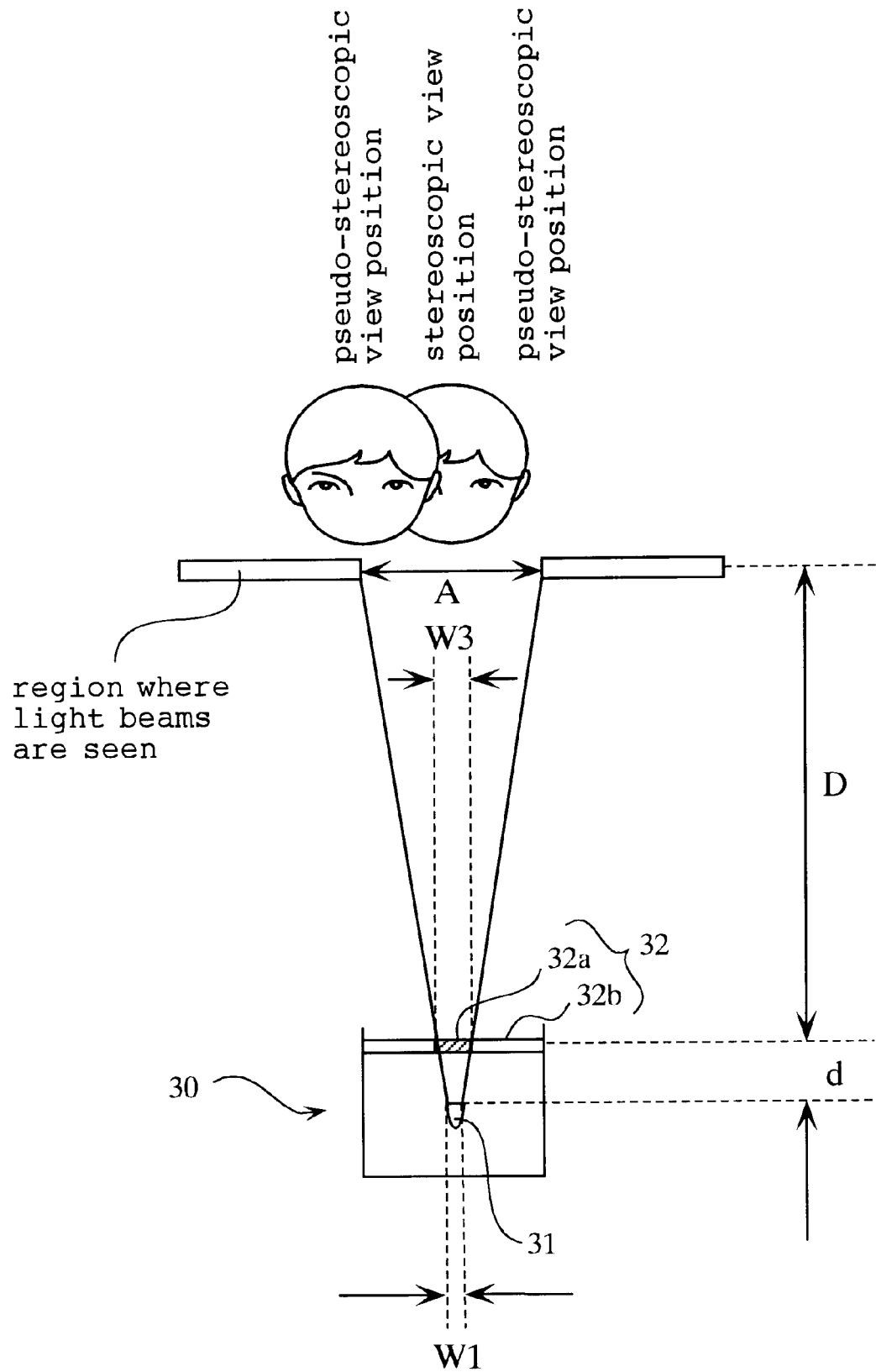
FIG. 9 is a plan view showing the relationship between stereoscopic view position teaching means and a viewer in a seventh embodiment of the present invention.

A seventh embodiment of the present invention will be described on the basis of FIG. 9. FIG. 9 is a plan view of a stereoscopic display according to the present embodiment. For convenience of illustration, FIG. 9 does not illustrate the appearance of the stereoscopic display, but illustrates the relationship between stereoscopic view position teaching means 30 arranged on the upper surface of the stereoscopic display and a viewer.

The stereoscopic view position teaching means 30 comprises one light emitting diode 31 emitting colorless light beams or light beams in a predetermined color, and light transmitting/shading means 32 having a light shading portion 32*a* and a light transmitting portion 32*b* which have a rectangular outer shape so formed therein that the light beams from the light emitting diode 31 can be seen when the viewer is positioned in a pseudo-stereoscopic view position upon deviating rightward or leftward from a stereoscopic view position. When the width of the light emitting diode 31 and the width of the light shading portion 32*a* are defined as shown in FIG. 9, the relationship in arrangement satisfies $d = D(W3-W1)/(A-W3)$.

If the stereoscopic display is thus constructed, the viewer notices that he or she deviates because the light beams from the light emitting diode 31 are seen with the right eye when the viewer deviates leftward from the stereoscopic view position, while noticing that he or she deviates because the light beams of the light emitting diode 31 are seen with the left eye when the viewer deviates rightward from the stereoscopic view position, as in the sixth embodiment. The viewer can find out the stereoscopic view position by moving his or her head rightward and leftward so that the light beams are not seen.

(Eighth Embodiment)

Figure 10:
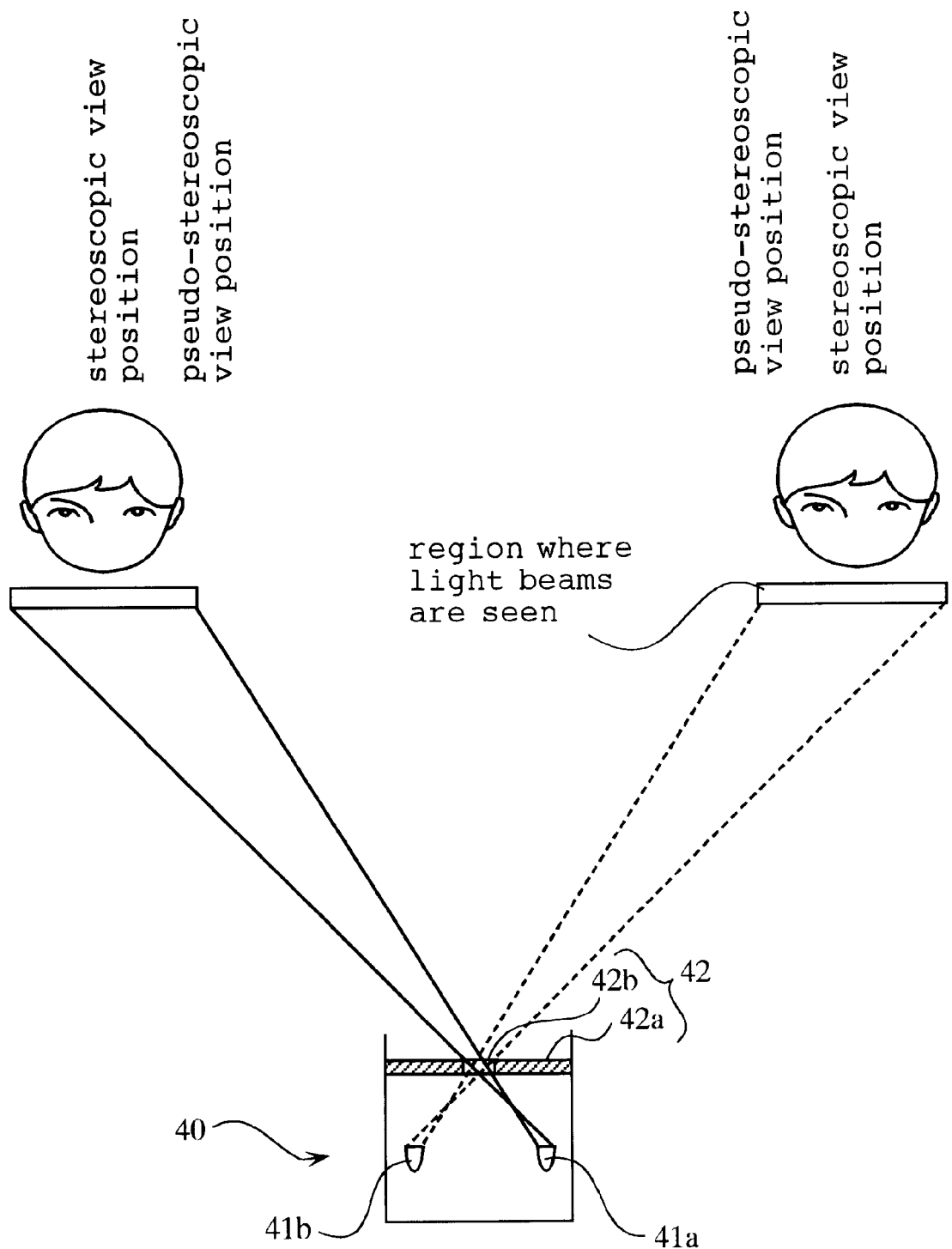
FIG. 10 is a plan view showing the relationship between stereoscopic view position teaching means and a viewer in an eighth embodiment of the present invention.

An eighth embodiment of the present invention will be described on the basis of FIG. 10. FIG. 10 is a plan view of a stereoscopic display according to the present embodiment. For convenience of illustration, FIG. 10 does not illustrate the appearance of the stereoscopic display, but illustrates the relationship between stereoscopic view position teaching means 40 arranged on the upper surface of the stereoscopic display and a viewer.

The stereoscopic view position teaching means 40 comprises two light emitting diodes 41a and 41b emitting colorless light beams or light beams in a predetermined color, and light transmitting/shading means 42 having a light shading portion 42a and a longitudinal slit-shaped light transmitting portion 42b so formed therein that the light beams from the light emitting diode 41a or the light emitting diode 41b cannot be seen when the viewer is positioned in a pseudo-stereoscopic view position upon deviating rightward or leftward from a stereoscopic view position. The positional relationship between each of the light emitting diodes 41a and 41b and the slit-shaped light transmitting portion 42b and the respective dimensions satisfy the positional relationship and the dimensions corresponding to the horizontal width of each of the endmost green light emitting diodes 9A and 9B, the horizontal pitch between the light emitting diodes, the horizontal width of the slit 10a, and the distance from a light emitting surface of the light emitting diode to the slit 10a, for example, as shown in the first embodiment.

In the present embodiment, the stereoscopic display is so constructed that two viewers can respectively position their heads in stereoscopic view positions. In FIG. 10, the viewer on the left side and the viewer on the right side can respectively find out the stereoscopic view positions by moving their heads rightward and leftward so that the light beams from the light emitting diode 41a can be seen and the light beams from the light emitting diode 41b can be seen.

(Ninth Embodiment)

Figure 11A:
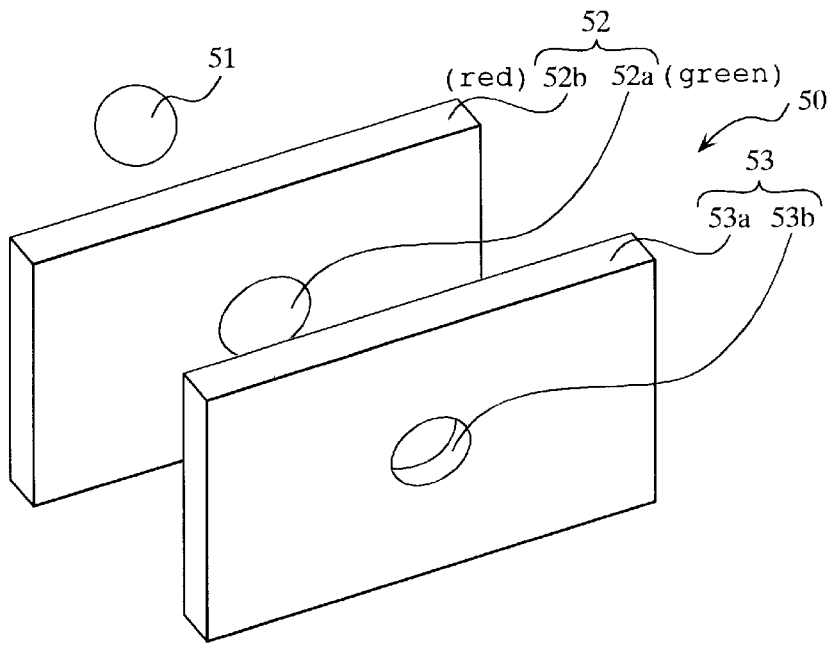
FIG. 11A is a perspective view showing one example of stereoscopic view position teaching means according to a ninth embodiment of the present invention.
Figure 11B:
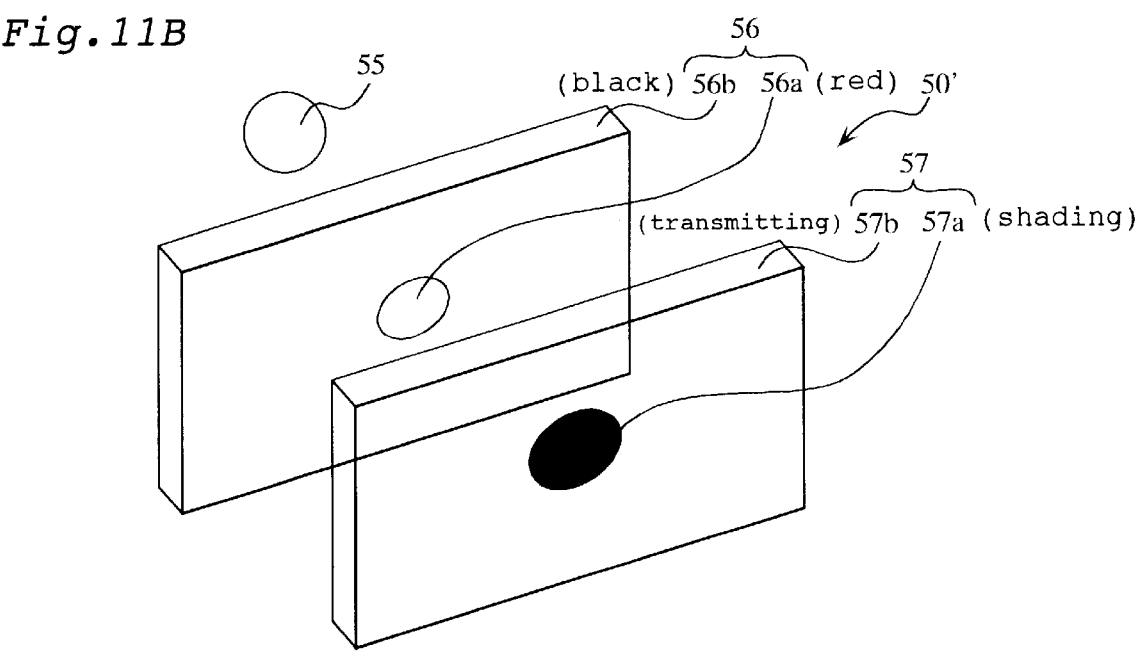
FIG. 11B is a perspective view showing another example of the stereoscopic view position teaching means according to the ninth embodiment of the present invention.

A ninth embodiment of the present invention will be described on the basis of FIGS. 11A and 11B. FIG. 11A is a perspective view showing stereoscopic view position teaching means 50 in the present embodiment, and FIG. 11B is a perspective view showing stereoscopic view position teaching means 50' in the present embodiment.

The stereoscopic view position teaching means 50 comprises a lamp 51, a colored transparent plate 52, and light transmitting/shading means 53. A green transparent portion 52a in an approximately circular shape is formed in the center of the colored transparent plate 52, and its peripheral portion is taken as a red transparent portion 52b. The horizontal width of the green transparent portion 52a corresponds to the width of the centermost green light emitting diode 9A, for example, shown in the first embodiment.

The light transmitting/shading means 53 is composed of a light shading portion 53a and a light transmitting portion 53b in an approximately circular shape. The transverse diameter of the light transmitting portion 53b in an approximately circular shape corresponds to the width of the slit 10a in the first embodiment, for example, while the longitudinal diameter of the light transmitting portion 53b in an approximately circular shape is so set that red light beams passing through the red transparent portion 52b are seen when the viewer deviates upward and downward from the stereoscopic view position. That is, when the stereoscopic view position teaching means 50 is used, the viewer can notice that he or she deviates from the stereoscopic view position when the red light beams are seen. At this time, even when the viewer deviates upward and downward from the stereoscopic view position, the red light beams are also seen, whereby the viewer can suitably find out the stereoscopic view position in the stereoscopic display in which a range in which a stereoscopic image is viewed also exists in the vertical direction by moving his or her head not only rightward and leftward but also upward and downward so that green light beams are seen.

In the above-mentioned stereoscopic view position teaching means 50, the green transparent portion 52a in an approximately circular shape may be replaced with a transparent portion in a color other than red. Further the green transparent portion 52a may be replaced with a black non-transparent portion. In this case, the viewer merely moves his or her head so that the red light beams are not seen.

The stereoscopic view position teaching means 50' comprises a lamp 55, a partial transparent plate 56, and light transmitting/shading means 57. A red transparent portion 56a is formed in the center of the partial transparent plate 56, and its peripheral portion is taken as a black non transparent portion 56b. The light transmitting/shading means 57 comprises a light shading portion 57a in an approximately circular shape and a light transmitting portion 57b formed in the periphery thereof.

The transverse diameter and the longitudinal diameter of the light shading portion 57a in an approximately circular shape are so set that red light beams passing through the red transparent portion 56a are seen when the viewer deviates upward and downward and rightward and leftward from a stereoscopic view position. That is, when the stereoscopic view position teaching means 50' is used, the viewer can notice that he or she deviates from the stereoscopic view position when the red light beams are seen. At this time, even when the viewer deviates upward and downward from the stereoscopic view position, the red light beams are seen. The viewer can suitably find out the stereoscopic view position in the stereoscopic display in which a range in which a stereoscopic image is viewed also exists in the vertical direction by moving his or her head not only rightward and leftward but also upward and downward so that the red light beams are not seen.

(Tenth Embodiment)

Figure 12:
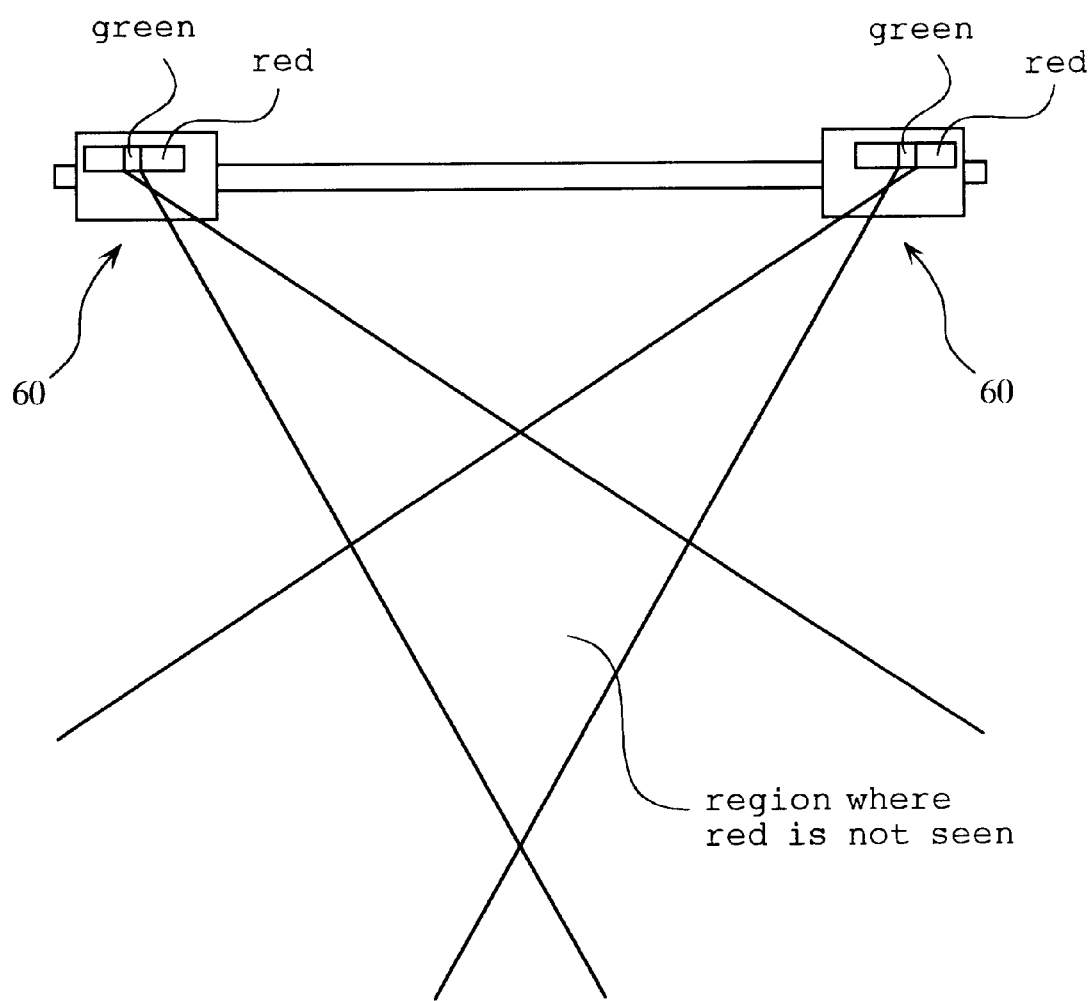
FIG. 12 is an explanatory view showing a tenth embodiment of the present invention.

A tenth embodiment of the present invention will be described on the basis of FIG. 12. FIG. 12 is a plan view of a stereoscopic display according to the present embodiment. For convenience of illustration, FIG. 12 does not illustrate the appearance of the stereoscopic display, but illustrates the relationship of the visible range of light beams emitted from two stereoscopic view position teaching means 60 arranged on the upper surface of the stereoscopic display.

The stereoscopic view position teaching means 60 described in the sixth embodiment to the ninth embodiment can be used as the stereoscopic view position teaching means 60.

The two stereoscopic view position teaching means 60 are arranged parallel to an image display screen (not shown) of the stereoscopic display at a distance corresponding to the width of the image screen away therefrom, and are so formed that a region in an approximately rhombic shape where both respective green light beams are seen corresponds to a stereoscopic view position. In other words, in the region in an approximately rhombic shape constituting the stereoscopic view position, neither of respective red light beams is seen. If the stereoscopic display is thus constructed, therefore, the viewer notices, when the viewer deviates not only rightward and leftward and upward and downward but also backward and forward from the stereoscopic view position, that he or she deviates because the green light beams are not seen (or the red light beams are seen). The viewer can find out the stereoscopic view position by moving his or her head backward and forward, upward and downward and rightward and leftward so that the green light beams are seen (or the red light beams are not seen).

(Eleventh Embodiment)

Figure 14:
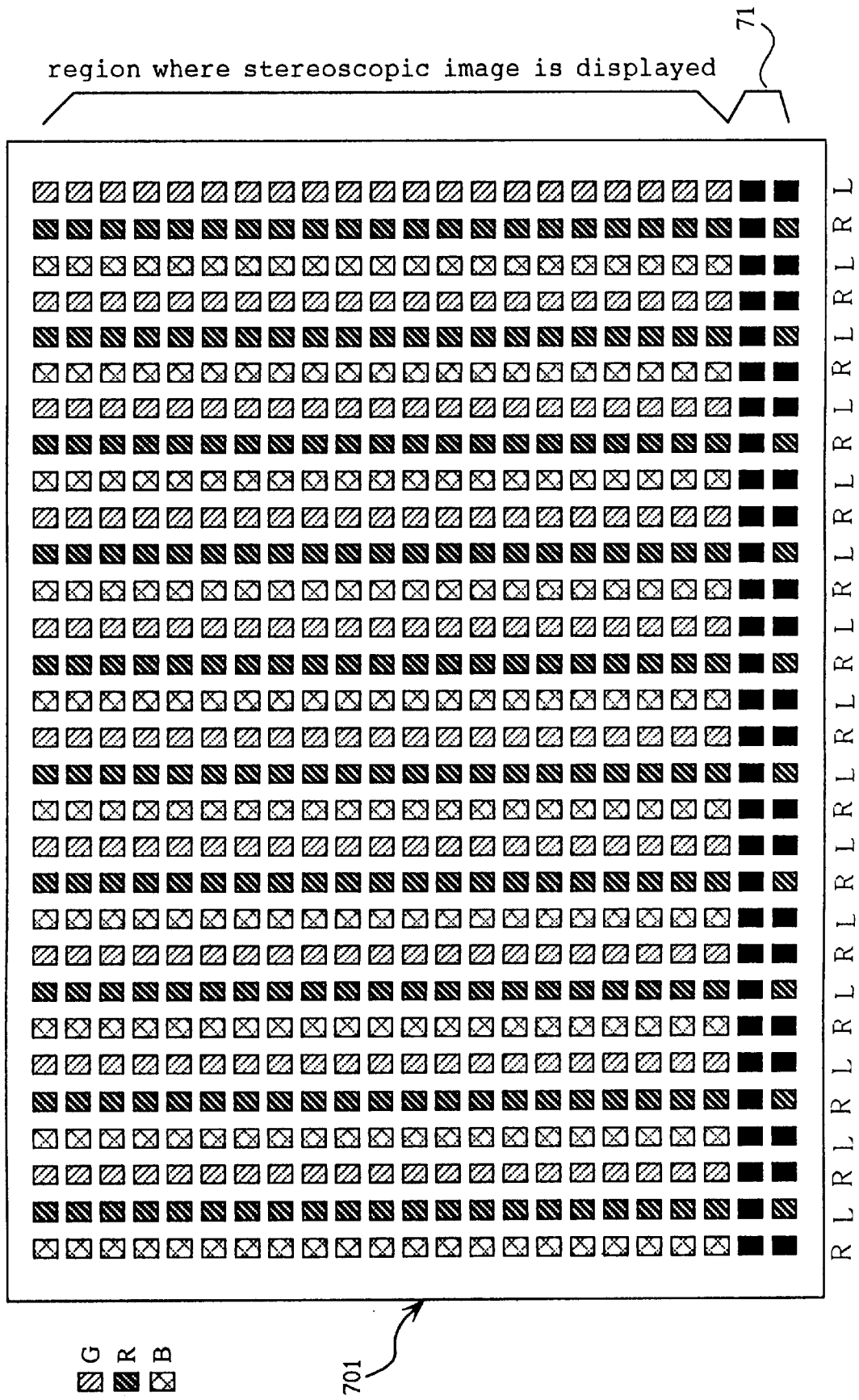
FIG. 14 is a front view of a liquid crystal display panel shown in FIG. 13.
Figure 15:
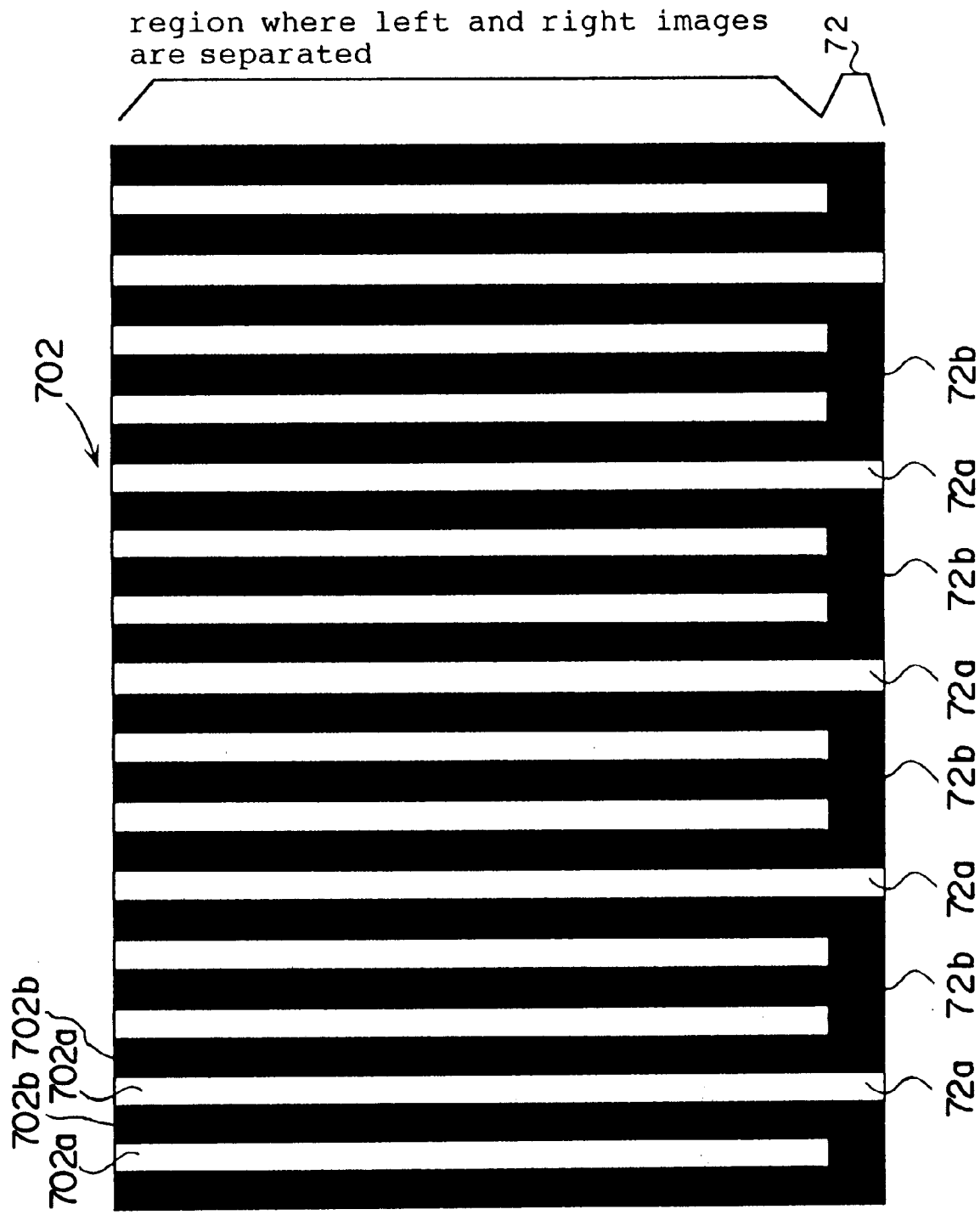
FIG. 15 is a front view of a parallax barrier shown in FIG. 13.

An eleventh embodiment of the present invention will be described on the basis of FIGS. 13 to 15.

In the present embodiment, light emitting means 71 and light transmitting/shading means 72 are constructed using a part of a display screen 70 of a stereoscopic display. Specifically, the light emitting means 71 is constructed using a part of a liquid crystal display panel 701 in the stereoscopic display (on the lower side of the screen in the present embodiment), as also shown in FIG. 14. The light transmitting/shading means 72 is constructed using a part of a parallax barrier 702 (on the lower side of the screen in the present embodiment), as also shown in FIG. 15.

The liquid crystal display panel 701 has R (red) pixels, G (green) pixels, and B (blue) pixels arranged thereon in this order, for example, R pixels (R), G pixels (L) pixels, B pixels (R), R pixels (L), G pixels (R), B pixels (L), . . . on each transverse line, and the pixels are successively used for L (left) and R (right). Only the R pixels enter a light transmitting state (a state where red light beams are emitted). On the other hand, a region where a stereoscopic image is separated in the parallax barrier 702 has a structure in which light transmitting portions 702a and light shading portions 702b which have predetermined widths are successively repeated, while a region to be the light transmitting/shading means 72 has a structure in which light transmitting portions 72a and light shading portions 72b, each formed by connecting the two light transmitting portions 702a and adapted to shade light, are successively repeated.

Figure 13:
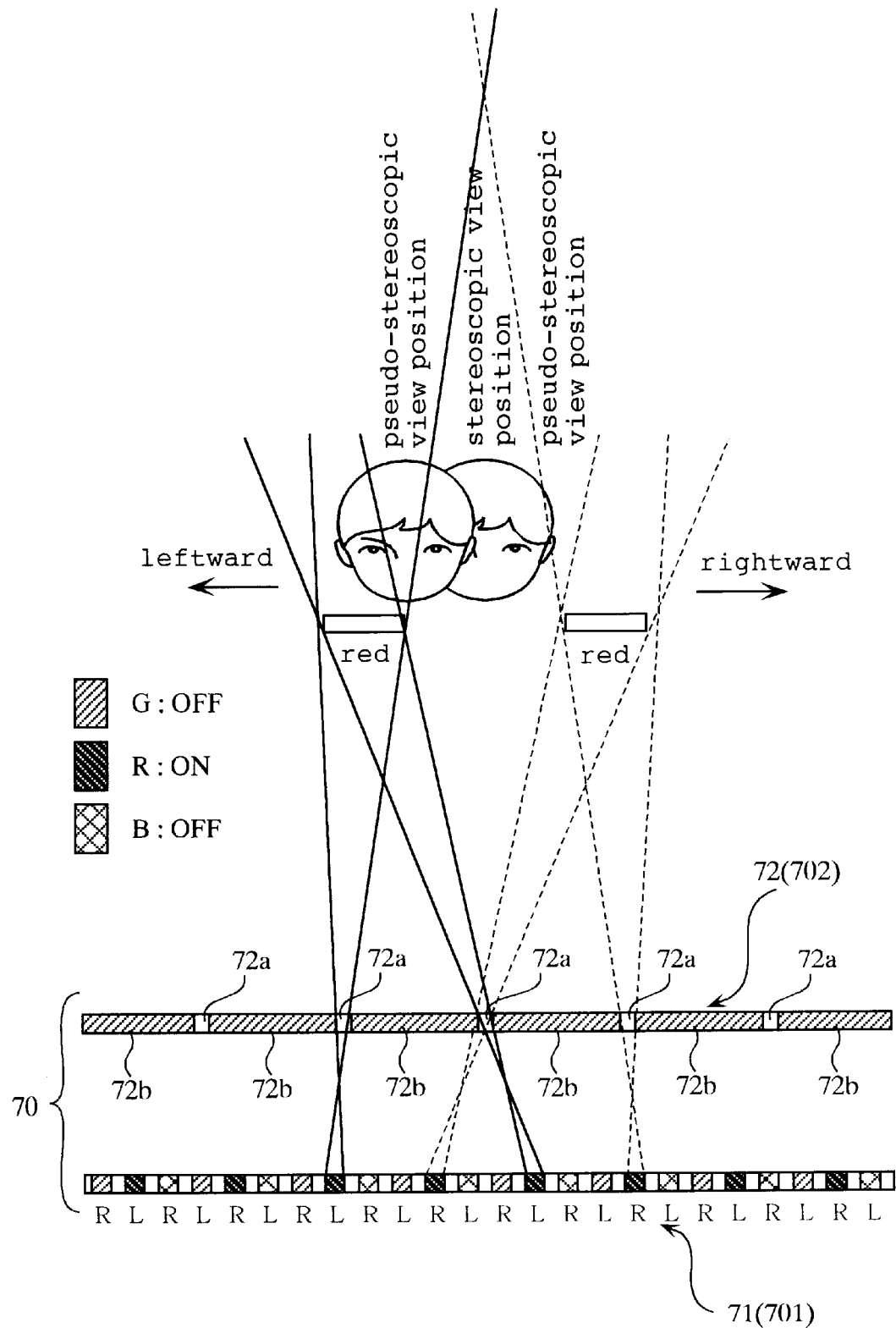
FIG. 13 is a plan view showing the relationship between stereoscopic view position teaching means and a viewer in an eleventh embodiment of the present invention.

When the viewer deviates leftward from a stereoscopic view position, as shown in FIG. 13, the viewer sees red light beams constituting the L (left) pixels with the right eye, so that the viewer notices that he or she deviates. On the other hand, when the viewer deviates rightward from the stereoscopic view position, the viewer sees red light beams constituting the R (right) pixels with the left eye, so that the viewer notices that he or she deviates. The viewer can find out the stereoscopic view position by moving his or her head rightward and leftward so that the red light beams are not seen. If the stereoscopic display is thus constructed, the light emitting means 71 and the light transmitting/shading means 72 are constructed integrally with the stereoscopic display, whereby the number of parts can be reduced, as compared with that in the stereoscopic displays in the first to tenth embodiments. Further, the necessity of aligning the light emitting means 71 and the light transmitting/shading means 72 is eliminated.

In the construction shown in the eleventh embodiment, that is, such construction that the light emitting means and the light transmitting/shading means are constructed using a part of the display screen of the stereoscopic display, it is possible to realize construction equivalent to those in the first to tenth embodiments.

Although in the embodiments, a parallax barrier system is illustrated, the present invention is not limited to the same. For example, a system using a lenticulated lens, for example, may be used. Further, the present invention is also applicable to a projection type in addition to a direct-view type.

(Twelfth Embodiment)

Figure 16:
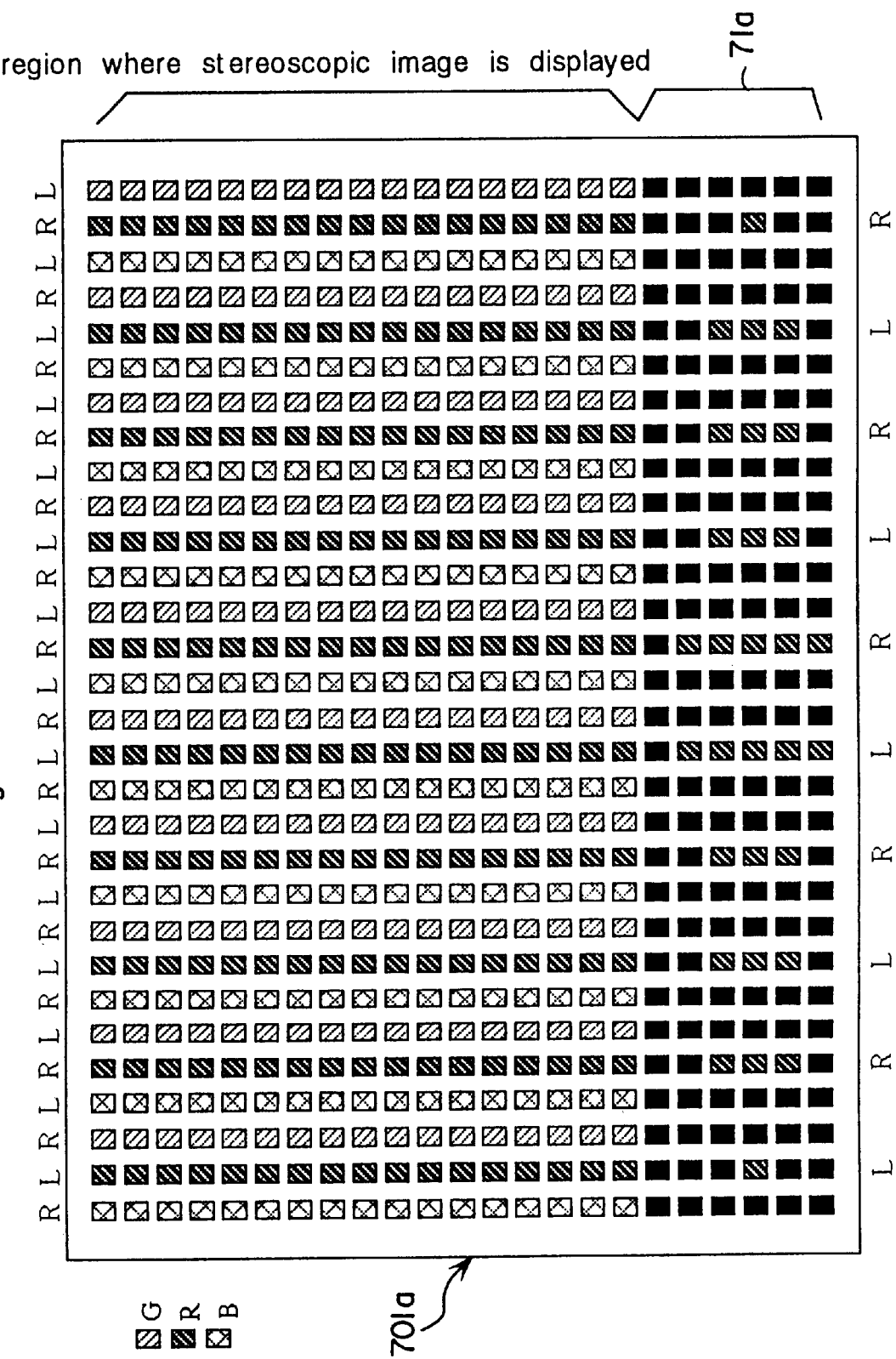
FIG. 16 is a front view of a liquid crystal display panel in a twelfth embodiment of the present invention.
Figure 17:
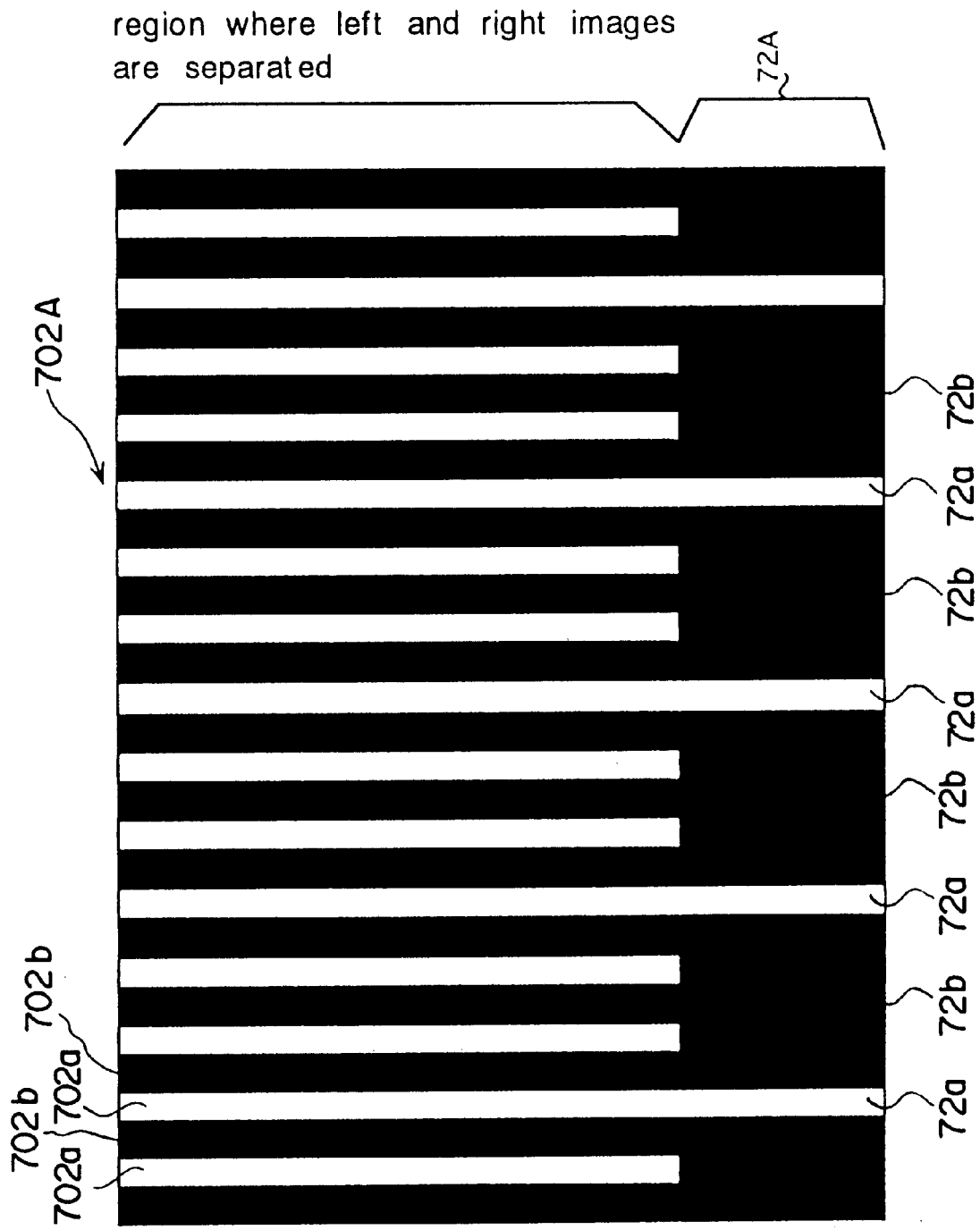
FIG. 17 is a front view of a parallax barrier in the twelfth embodiment of the present invention.

In a twelfth embodiment, light emitting means 71a and light transmitting/shading means 72A are constructed using a part of a display screen 70 of a stereoscopic display, as described in the eleventh embodiment. The light emitting means 71a is constructed using a part of a liquid crystal display panel 701a (on the lower side of the screen in the present embodiment) in the stereoscopic display, as shown in FIG. 16. The light transmitting/shading means 72A is constructed using a part of a parallax barrier 702A (on the lower side of the screen in the present embodiment), as shown in FIG. 17.

In a light emitting region on the lower side of the screen, only a group of R pixels enters a light transmitting state (a state where red light beams are emitted) as in the tenth embodiment and particularly, only predetermined pixels out of the group of R pixels enter a light transmitting state. A portion to be the light transmitting/shading means 72A in the parallax barrier 702A has a structure in which light transmitting portions 72a and light shading portions 72b, each formed by connecting two light transmitting portions 702a and adapted to shade light, are successively repeated, as in the tenth embodiment. The predetermined pixels do not shade light, so that light transmitting/shading means is wider than that in the tenth embodiment.

Figure 18A:
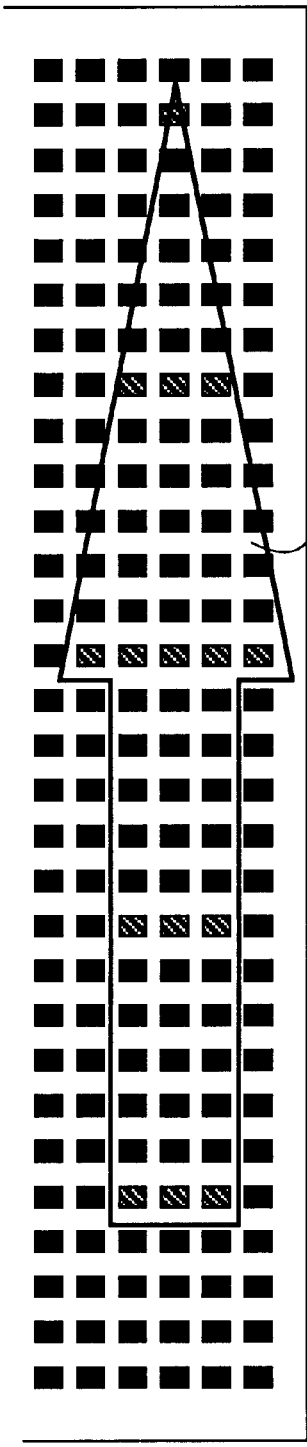
FIG. 18A is a schematic view showing a state where right eye pixels on a liquid crystal display panel in the twelfth embodiment of the present invention are viewed.
Figure 18B:
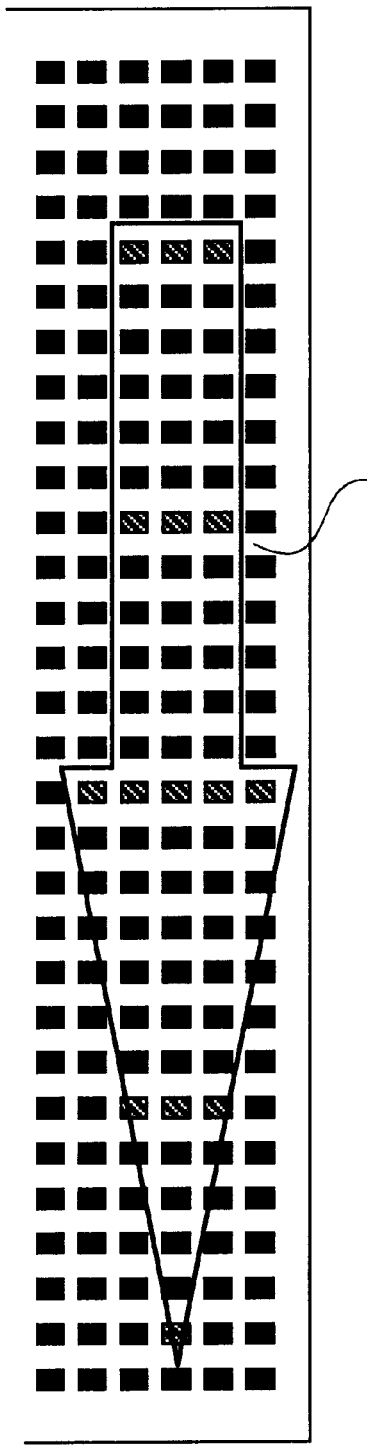
FIG. 18B is a schematic view showing a state where left eye pixels on the liquid crystal display panel in the twelfth embodiment of the present invention are viewed.

When the viewer moves leftward to deviate from a range in which stereoscopic view is possible, only the predetermined pixels are in a light transmitting state, whereby the R pixels for right eye are viewed with the left eye of the viewer. Consequently, the viewer views a rightward arrow RR with the left eye, as shown in FIG. 18A. Therefore, the viewer recognizes that he or she should move rightward. On the other hand, when the viewer moves rightward to deviate from a range in which stereoscopic view is possible, only the predetermined pixels are in a light transmitting state, whereby the R pixels for left eye are viewed with the right eye of the viewer. Consequently, the viewer views a leftward arrow RL with the right eye, as shown in FIG. 18B. Therefore, the viewer recognizes that he or she should move leftward. The viewer can easily find out a stereoscopic view position by moving in accordance with the arrows.

(Thirteenth Embodiment)

Figure 19:
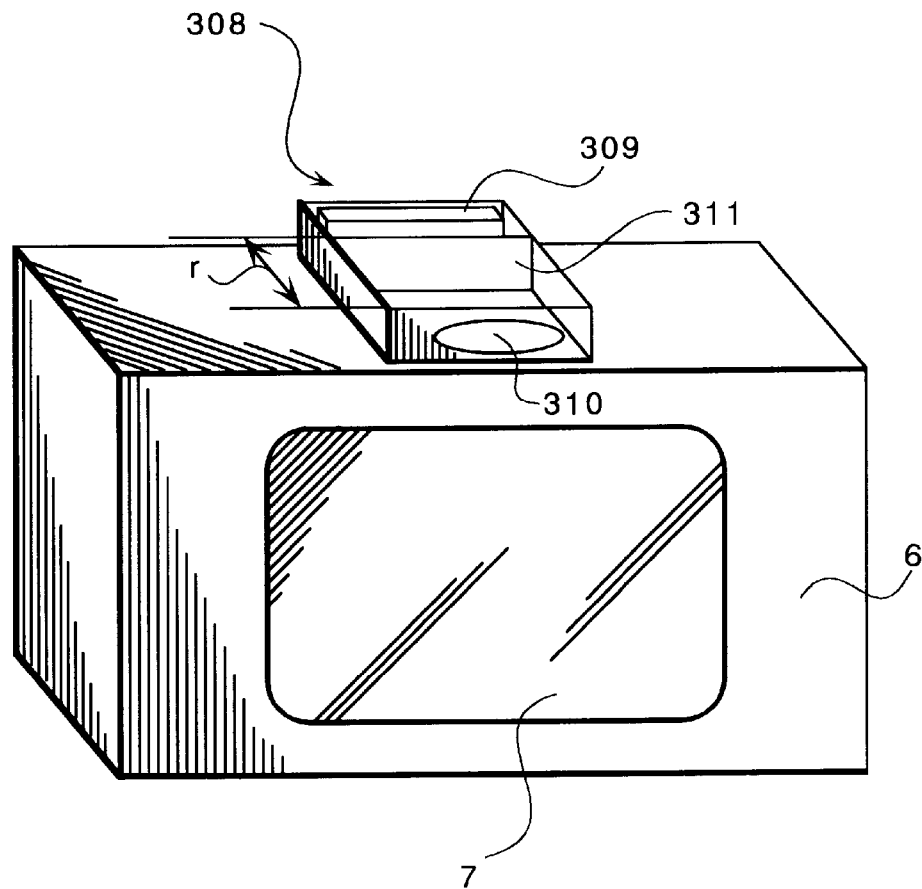
FIG. 19 is a perspective view showing the appearance of a stereoscopic display according to a thirteenth embodiment of the present invention.

FIG. 19 is a perspective view showing the appearance of a stereoscopic view position detecting unit 308 provided in a stereoscopic display according to a thirteenth embodiment of the present invention. The stereoscopic view position detecting unit 308 comprises a back light 309 emitting light beams forward, a lens 310 for collecting the light beams from the back light 309, and a transparent sheet 311 interposed between the back light 309 and the lens 310, as shown in FIG. 19.

Figure 20A:
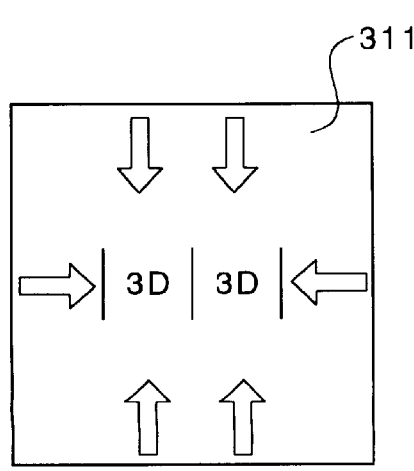
FIG. 20A is a plan view showing the specific construction of a transparent sheet shown in FIG. 19.

On the transparent sheet 311, character "3D" in the center and patterns such as arrows on the right and left sides and the upper and lower sides are formed, as shown in FIG. 20A. The transparent sheet 311 is so formed that the characters and the patters such as the arrows transmit the light beams from the back light 309, and the other portion shades the light beams. The transparent sheet 311 may be so formed that the characters and the arrows shade the light beams from the back light 309, and the other portion transmits the light beams. Alternatively, the transparent sheet 311 may be so formed that both the characters and the arrows and the other portion transmit the light beams from the back light 309, but differ in color.

Figure 20B:
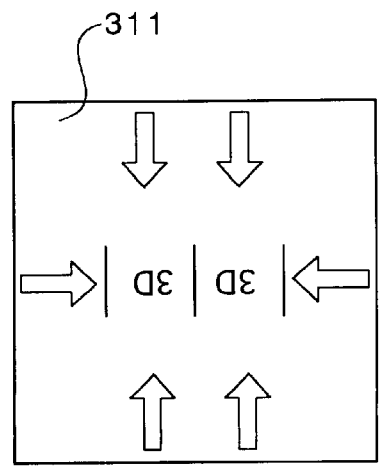
FIG. 20B is a plan view showing the actual state where the transparent sheet shown in FIG. 19 is arranged.

Since the transparent sheet 311 is viewed by a viewer through the lens 310, it is arranged in the stereoscopic view position detecting unit 308 so that the characters are reversed vertically and horizontally as viewed from the viewer, as shown in FIG. 20B. The transparent sheet 311 is set in a position spaced a distance r apart from the lens 310. Letting f be the focal length of the lens 310, and R be a proper viewing distance, the distance r is a value slightly larger than r' satisfying 1/r'+1/R=1/f.

Figure 21:
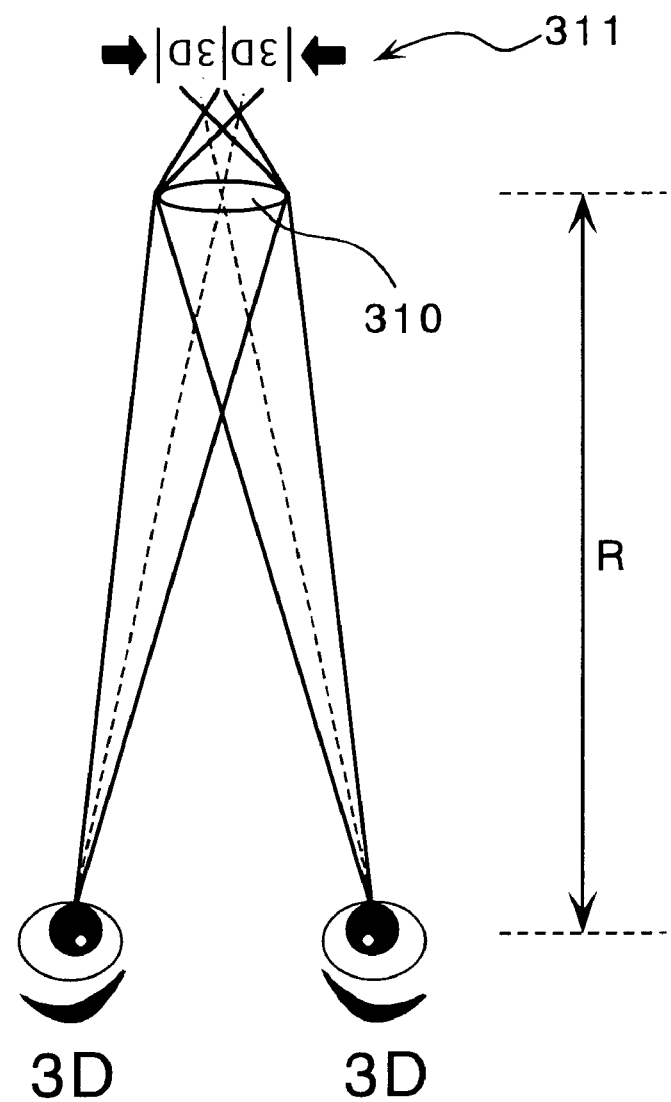
FIG. 21 is a diagram showing the relationship between a viewer in a stereoscopic view position and the transparent sheet in the stereoscopic display according to the thirteenth embodiment.

By the above-mentioned construction, the viewer views the characters "3D" on the transparent sheet 311 with both the eyes at a stereoscopic view position spaced the proper viewing distance R apart which is set by the focal length of the lens 310, as shown in FIG. 21. Consequently, the viewer does not have an uncomfortable feeling because he or she sees the same patterns with both the eyes.

Figure 22A:
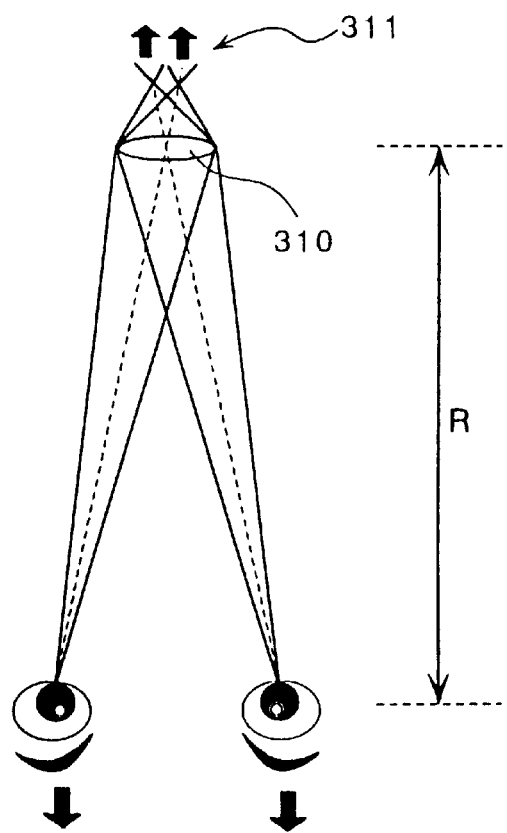
FIG. 22A is a schematic view showing the relationship between a viewer in a position deviating downward from the stereoscopic view position and the transparent sheet in the stereoscopic display according to the thirteenth embodiment.
Figure 22B:
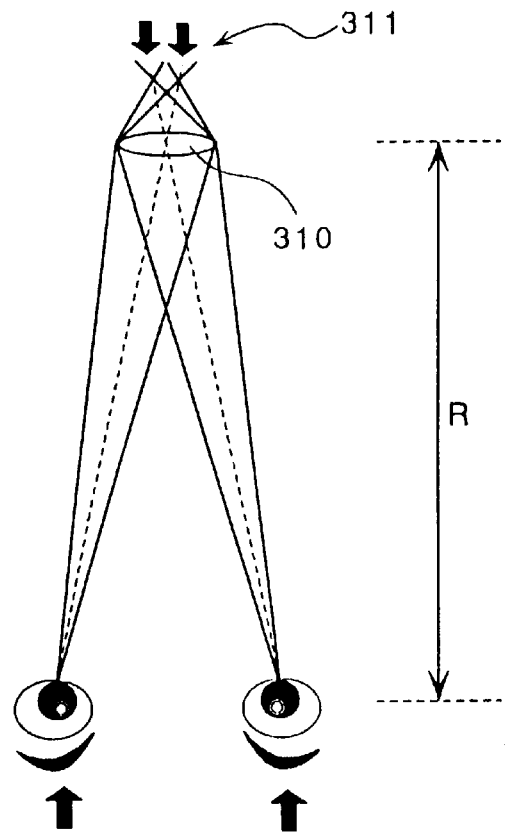
FIG. 22B is a schematic view showing the relationship between a viewer in a position deviating upward from the stereoscopic view position and the transparent sheet in the stereoscopic display according to the thirteenth embodiment.

When the viewer moves upward from the stereoscopic view position, the viewer views not characters "3D" but downward arrows, as shown in FIG. 22A. When the viewer moves downward from the stereoscopic view position, the viewer views not characters "3D" but upward arrows, as shown in FIG. 22B. Consequently, the viewer recognizes that he or she should move in the directions shown by the arrows.

Figure 23A:
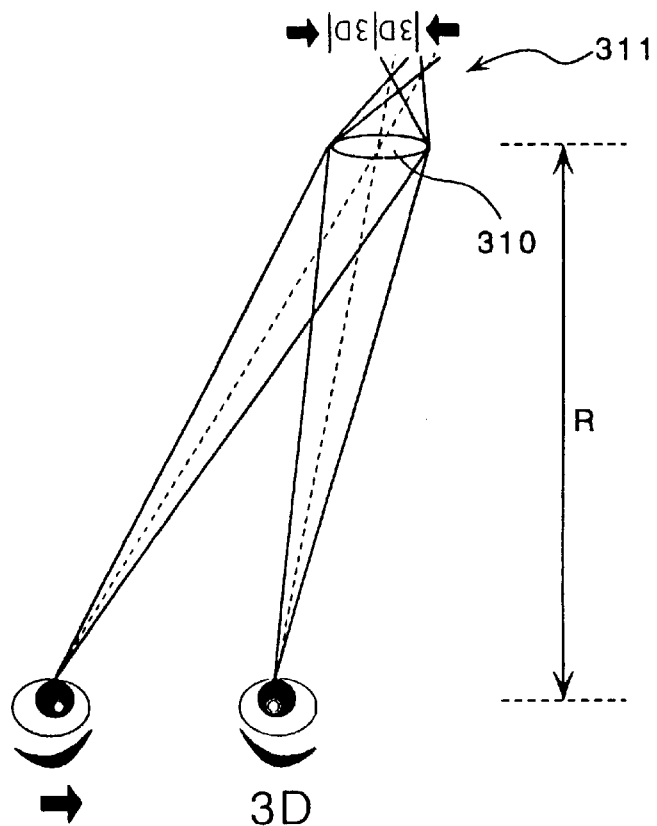
FIG. 23A is a schematic view showing the relationship between a viewer in a position deviating leftward toward the stereoscopic view position detecting unit from the stereoscopic view position and the transparent sheet in the stereoscopic display according to the thirteenth embodiment.
Figure 23B:
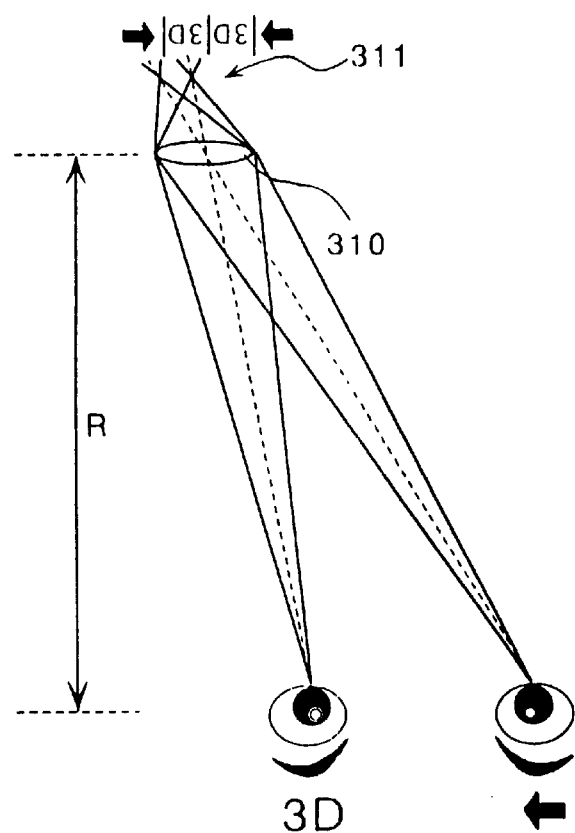
FIG. 23B is a schematic view showing the relationship between the viewer in a position deviating rightward toward the stereoscopic view position detecting unit from the stereoscopic view position and the transparent sheet in the stereoscopic display according to the thirteenth embodiment.

When the viewer moves leftward toward the stereoscopic view position detecting unit 308 from the stereoscopic view position, the viewer views characters "3D" or signs "|" with the right eye, and views arrows with the left eye, as shown in FIG. 23A. The viewer sees different patterns with the right and left eyes, whereby the viewer has an uncomfortable feeling. On the contrary, when the viewer moves rightward toward the stereoscopic view position detecting unit 308 from the stereoscopic view position, the viewer views characters "3D" or signs "|" with the left eye, and views arrows with the right eye, as shown in FIG. 23B. The viewer sees different patterns with the right and left eyes, whereby the viewer has an uncomfortable feeling. That is, when the viewer moves rightward and leftward from the stereoscopic view position, the viewer sees different patterns with the right and left eyes, whereby the viewer has an uncomfortable feeling, and finds that the position of the viewer is not the stereoscopic view position. In addition thereto, the viewer views arrows directed toward the stereoscopic view position, whereby the viewer moves in the directions shown by the arrows, to search for the position where the characters "3D" can be viewed without any uncomfortable feeling. Therefore, the viewer can easily know the stereoscopic view position.

Figure 24A:
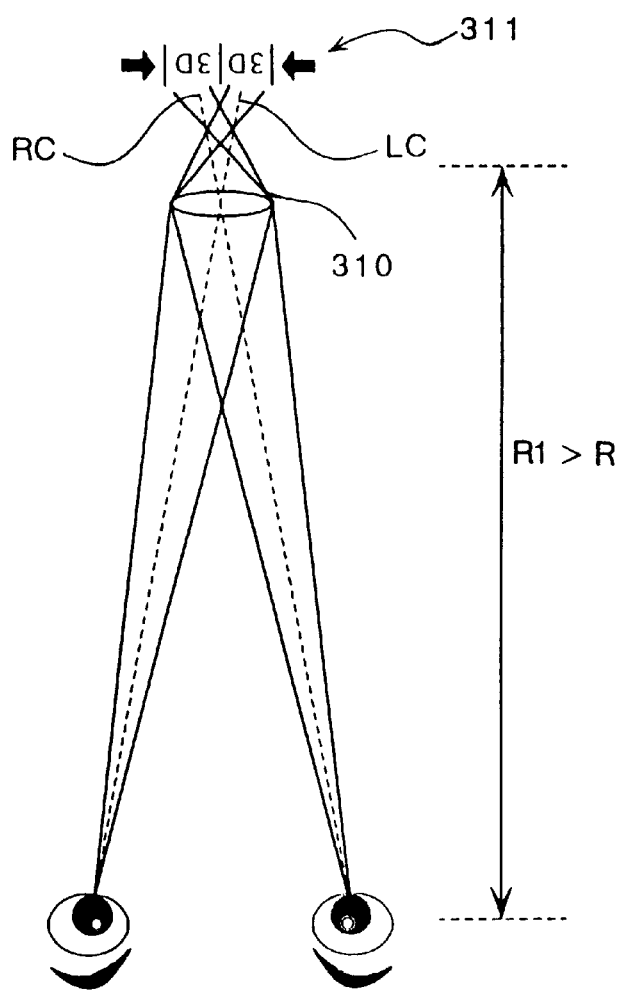
FIG. 24A is a schematic view showing the relationship between a viewer in a position deviating backward from the stereoscopic view position and the transparent sheet in the stereoscopic display according to the thirteenth embodiment.
Figure 24B:
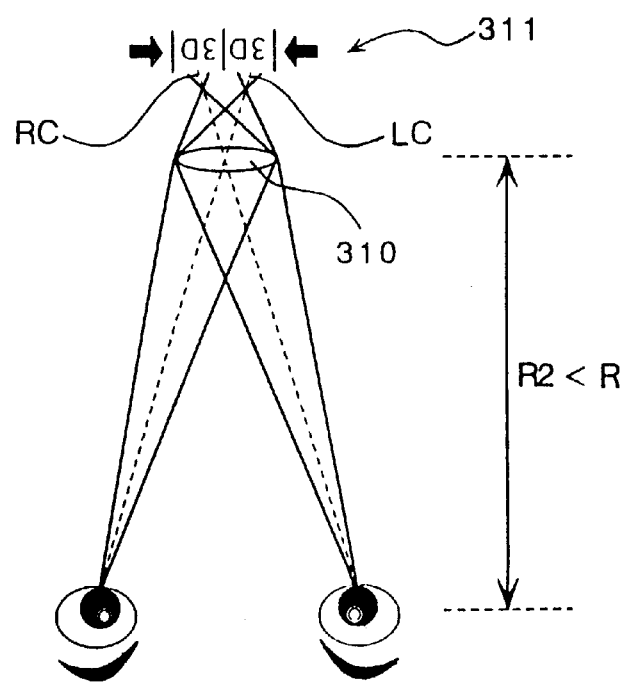
FIG. 24B is a schematic view showing the relationship between the viewer in a position deviating forward from the stereoscopic view position and the transparent sheet in the stereoscopic display according to the thirteenth embodiment.

When the viewer is positioned at a distance R1 farther apart from the display screen of the stereoscopic display than the proper viewing distance R, as shown in FIG. 24A, the center RC of the visual field of the right eye of the viewer and the center LC of the visual field of the left eye of the viewer approach each other. Therefore, the viewer views different patterns (the characters "3D" which differ in the position of focus) with the right and left eyes, to have an uncomfortable feeling. In addition thereto, the viewer does not easily view the patterns and the characters because the patterns and the characters look small and are slightly blurred. When the viewer is positioned at a distance R2 nearer to the display screen of the stereoscopic display than the proper viewing distance R, as shown in FIG. 24B, the centers of the visual fields of the right and left eyes of the viewer are spaced apart from each other. Therefore, the viewer respectively views different patterns with the right and left eyes, to have an uncomfortable feeling. In this case, image forming points of the right and left pupils of the viewer approach the transparent sheet 311. Therefore, the patterns and the characters are made difficult to recognize because they look large and are blurred. Consequently, the viewer can find out a proper viewing position formed in a position spaced the proper viewing distance R apart by moving backward and forward so that the characters "3D" can be clearly recognized without any uncomfortable feeling.

Figure 25A:
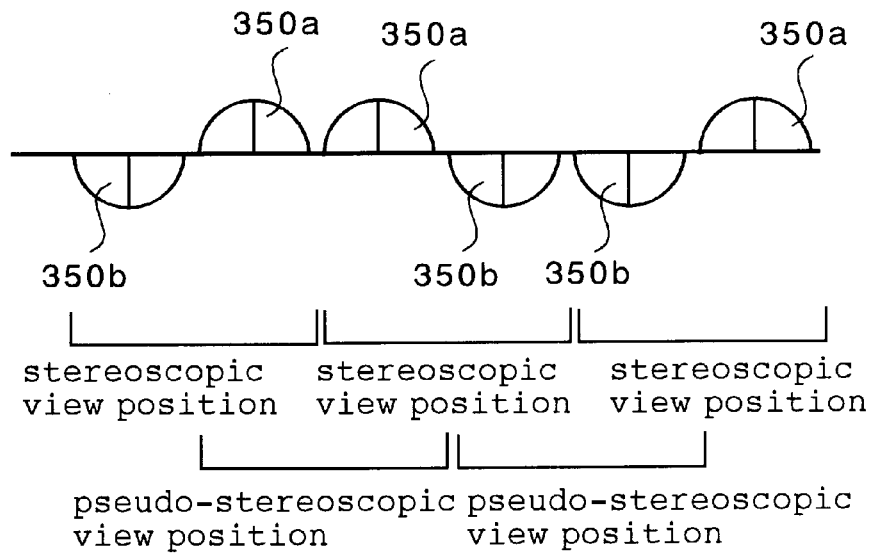
FIG. 25A is a schematic view showing a transparent sheet on which patterns in another example are formed.
Figure 25B:
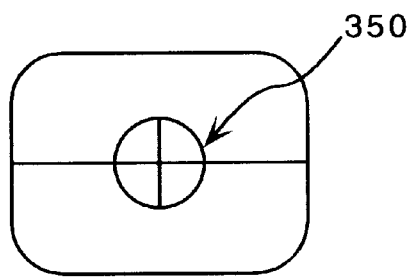
FIG. 25B is a schematic view showing patterns which can be viewed in a stereoscopic view position.
Figure 25C:
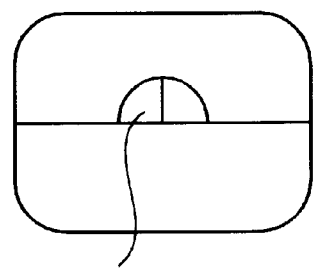
FIG. 25C is a schematic view showing patterns which can be viewed in a pseudo-stereoscopic view position on the left side toward the stereoscopic view position detecting unit.
Figure 25D:
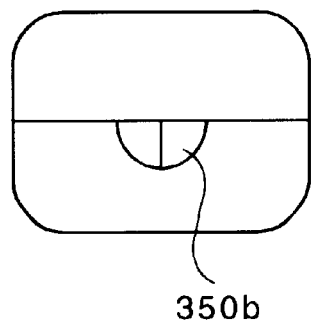
FIG. 25D is a schematic view showing patterns which can be viewed in a pseudo-stereoscopic view position on the right side toward the stereoscopic view position detecting unit.

Furthermore, patterns in the upper half 350a and patterns in the lower half 350b may be formed, as shown in FIG. 25A, on the transparent sheet 311. At this time, the viewer can accurately view the patterns 350 at a stereoscopic view position, as shown in FIG. 25B. In a pseudo-stereoscopic view position moved leftward toward the stereoscopic view position detecting unit 308 from the stereoscopic view position, the patterns in the upper half 350a are viewed, as shown in FIG. 25C. In a pseudo-stereoscopic view position moved rightward toward the stereoscopic view position detecting unit 308 from the stereoscopic view position, the patterns in the lower half 350b can be viewed, as shown in FIG. 25D. If the stereoscopic display is thus constructed, the viewer can view a deviation between the upper half and the lower half of the patterns 350. Consequently, it is possible to easily view a deviation in the vicinity of the stereoscopic view position. The viewer can easily find out an accurate stereoscopic view position. Further, the construction of the transparent sheet 311 as shown in FIG. 25A can also cope with a case where there are two or more stereoscopic view positions.

Figure 26A:
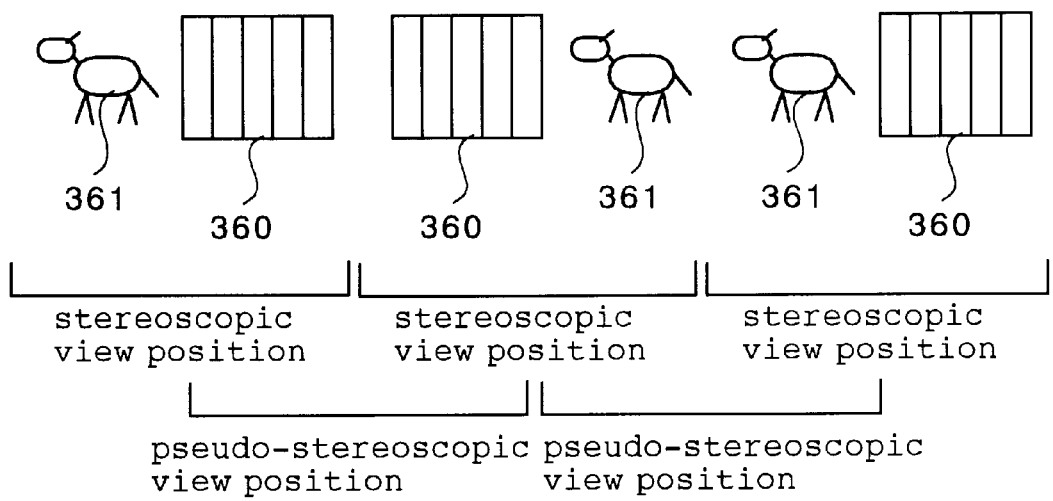
FIG. 26A is a schematic view showing a transparent sheet in which patterns in still another example are formed.
Figure 26B:
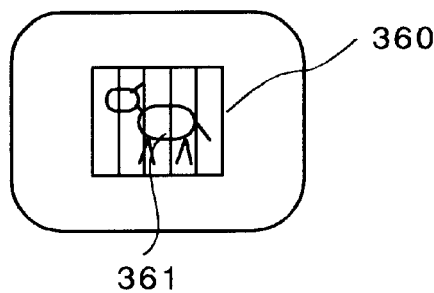
FIG. 26B is a schematic view showing patterns which can be viewed in a stereoscopic view position.
Figure 26C:
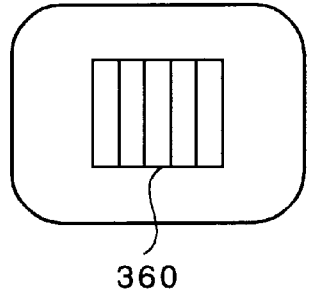
FIG. 26C is a schematic view showing patterns which can be viewed in a pseudo-stereoscopic view position on the left side toward the stereoscopic view position detecting unit.
Figure 26D:
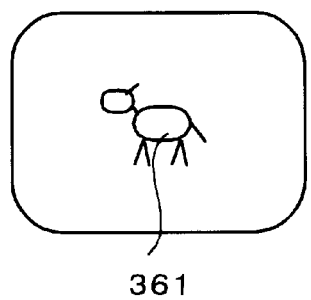
FIG. 26D is a schematic view showing patterns which can be viewed in a pseudo-stereoscopic view position on the right side toward the stereoscopic view position detecting unit.

Furthermore, patterns representing cages 360 and animals 361 may be formed, as shown in FIG. 26A, on the transparent sheet 311. Consequently, a viewer can view the animal 361 kept in the cage 360, as shown in FIG. 26B, in a stereoscopic view position. On the other hand, the viewer views only the cage 360, as shown in FIG. 26C, in a pseudo-stereoscopic view position moved leftward toward the stereoscopic view position detecting unit 308 from the stereoscopic view position, while viewing only the animal 361, as shown in FIG. 26D, in a pseudo-stereoscopic view position moved rightward toward the stereoscopic view position detecting unit 308 from the stereoscopic view position. The use of the transparent sheet 311 allows the viewer to view the patterns of animal 36 kept in the cage 360 without any uncomfortable feeling even in a position slightly deviating from the stereoscopic view position. Therefore, the viewer can know a stereoscopic view region.

Figure 27:
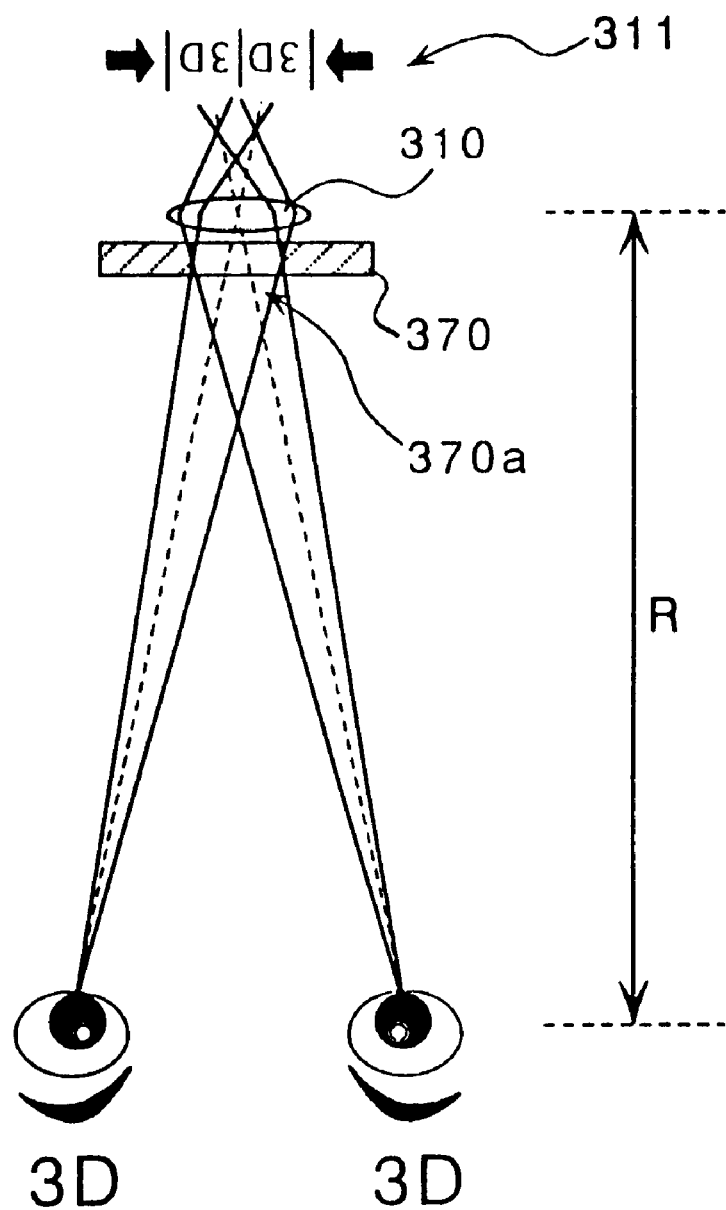
FIG. 27 is a schematic view for explaining a structure in which a barrier plate is provided in a condenser lens in the stereoscopic display according to the thirteenth embodiment of the present invention.

As shown in FIG. 27, a barrier plate 370 having a slit 370a may be provided on the light emission side of a lens 310 in the stereoscopic view position detecting unit 308. Such construction makes it possible to shade light beams from a peripheral portion, where an image is distorted due to aberration, of the lens 310. Therefore, the viewer easily sees the patterns on the transparent sheet 311.

According to the construction in the above-mentioned thirteenth embodiment, the viewer can easily find out the stereoscopic view position by seeing the patterns and the characters, for example, displayed on the stereoscopic view position detecting unit 308. Particularly, the viewer can easily find out the stereoscopic view position by seeing arrows pointing toward the stereoscopic view position, which is convenient for the viewer.

In all the embodiments, the stereoscopic display may be so constructed that the light emitting unit flickers. Such construction makes it easier for the user to understand the light beams from the light emitting unit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A stereoscopic display for separating light beams from a left eye image and a right eye image which are displayed on a display panel into left image light beams and right image light beams and supplying the left image light beams and the right image light beams to a viewer, comprising:

stereoscopic view position teaching means comprising light emitting means for emitting a plurality of light beams wherein a first portion of said plurality of light beams are in a first state and a second portion of said light beams are in a second state; and a barrier plate arranged in front of the light emitting means on the side of said viewer and having a slit through which part of the light beams from the light emitting means are passed toward the viewer; wherein the stereoscopic view position teaching means is constructed such that the first state of the light beams from said light emitting means is incident on the left eye and the right eye of said viewer when said viewer is in a stereoscopic view position where a stereoscopic image can be viewed from the stereoscopic display and the second state of the light beams from the light emitting means is incident on the left eye and the right eye of the viewer in a position different from said stereoscopic view position and said first state and said second state of said light beams are visually distinguishable from each other.

2. The stereoscopic display according to claim 1, wherein said light emitting means emits light beams in a first color and light beams in a second color different from the light beams in the first color, and said first state is a state where the light beams in the same color are incident on the left eye and the right eye of the viewer, and said second state is a state where the light beams in different colors are respectively incident on the left eye and the right eye of the viewer.

3. The stereoscopic display according to claim 1, wherein said light emitting means emits light beams in a first color and light beams in a second color different from the light beams in the first color, and said first state is a state where the light beams in different colors are respectively incident on the left eye and the right eye of the viewer, and said second state is a state where the light beams in the same color are incident on the left eye and the right eye of the viewer.

4. The stereoscopic display according to claim 1, wherein said light emitting means emits light beams in a first outer shape and light beams in a second outer shape different from the light beams in the first outer shape, and said first state is a state where the light beams in the same outer shape are incident on the left eye and the right eye of the viewer, and said second state is a state where the light beams in different outer shapes are respectively incident on the left eye and the right eye of the viewer.

5. The stereoscopic display according to claim 4, wherein the light beams in said first outer shape and the light beams in said second outer shape have different colors.

6. The stereoscopic display according to claim 1, wherein said light emitting means emits light beams in a first outer shape and light beams in a second outer shape different from the light beams in the first outer shape, and said first state is a state where the light beams in different outer shapes are respectively incident on the left eye and the right eye, and said second state is a state where light beams in the same outer shape are incident on the left eye and the right eye.

7. The stereoscopic display according to claim 6, wherein the light beams in said first outer shape and the light beams in said second outer shape have different colors.

8. The stereoscopic display according to claim 1, wherein said first state and said second state are produced by light emitting elements in different vertical positions.

9. The stereoscopic display according to claim 1, wherein a different number of light emitting elements are viewed by a viewer in said first state and said second state.

10. The stereoscopic display according to claim 9, wherein said first state and said second state differ in the vertical positions of the light emitting elements.

11. The stereoscopic display according to claim 1, wherein said light emitting means is composed of a plurality of light emitting elements, and is so constructed as to satisfy the following equations, letting d be the distance from each of said light emitting elements to said barrier plate, P be a horizontal pitch between the light emitting elements, W1 be the horizontal width of each of the light emitting elements, W2 be the horizontal width of the slit of said barrier plate, D be the distance from the barrier plate to the viewer viewing at the first state, A be the horizontal width of the light beam in the first state, and B be the horizontal width of the light beam in the second state:

$d = D(W1+W2)/(A+B-W2)$ $P = (W1+W2)(A+B)/(A+B-W2)$.

12. The stereoscopic display according to claim 1, wherein said light emitting means is composed of a plurality of light emitting elements, and is so constructed as to satisfy the following equations, letting d be the distance from each of said light emitting elements to said barrier plate, P be a horizontal pitch between the light emitting elements, W1 be the horizontal width of each of the light emitting elements, W2 be the horizontal width of the slit of the barrier plate, D be the distance from the barrier plate to the viewer viewing at the first state, C be the horizontal width of the light beam in the second state, and E be the distance between the eyes of the viewer:

$d = D(W1+W2)/(C+E-W2)$ $P = 2E(W1+W2)/(C+E-W2)$.

13. The stereoscopic display according to claim 1, wherein said light emitting means is composed of a plurality of light emitting elements, and is so constructed as to satisfy the following equations, letting d be the distance from each of said light emitting elements to said barrier plate, P be a horizontal pitch between the light emitting elements, W1 be the horizontal width of each of the light emitting elements, W2 be the horizontal width of the slit of the barrier plate, D be the distance from the barrier plate to the viewer viewing at the first state, and E be the distance between the eyes of the viewer:

P=E(W1+W2)/(E−W2)

d=DP/E.

14. A stereoscopic display for separating light beams from a left eye image and a right eye image which are displayed on a display panel into left image light beams and right image light beams and supplying the left image light beams and the right image light beams to a viewer, comprising:

stereoscopic view position teaching means comprising light emitting means for emitting a plurality of light beams wherein a first portion of said plurality of light beams are in a first state and a second portion of said light beams are in a second state; and a barrier plate arranged in front of said light emitting means on the side of said viewer and having a plurality of slits through which part of the light beams from said light emitting means are passed toward the viewer, wherein the stereoscopic view position teaching means is constructed such that the first state of the light beams from said light emitting means is incident on the left eye and the right eye of said viewer when said viewer is in a stereoscopic view position where a stereoscopic image can be viewed from the stereoscopic display and, the second state of the light beams from the light emitting means is incident on the left eye and the right eye of the viewer in a position different from said stereoscopic view position and said first state and said second state of said light beams are visually distinguishable from each other.

15. The stereoscopic display according to claim 14, wherein said light emitting means emits light beams in a first color and light beams in a second color different from the light beams in the first color, and said first state is a state where the light beams in the same color are incident on the left eye and the right eye of the viewer, and said second state is a state where the light beams in different colors are respectively incident on the left eye and the right eye of the viewer.

16. The stereoscopic display according to claim 14, wherein said light emitting means emits light beams in a first color and light beams in a second color different from the light beams in the first color, and said first state is a state where the light beams in different colors are respectively incident on the left eye and the right eye of the viewer, and said second state is a state where the light beams in the same color are incident on the left eye and the right eye of the viewer.

17. The stereoscopic display according to claim 14, where in said light emitting means emits light beams in a first outer shape and light beams in a second outer shape different from the light beams in the first outer shape, and said first state is a state where the light beams in the same outer shape are incident on the left eye and the right eye of the viewer, and said second state is a state where the light beams in different outer shapes are respectively incident on the left eye and the right eye of the viewer.

18. The stereoscopic display according to claim 17, wherein the light beams in said first outer shape and the light beams in said second outer shape have different colors.

19. The stereoscopic display according to claim 14, wherein said light emitting means emits light beams in a first outer shape and light beams in a second outer shape different from the light beams in the first outer shape, and said first state is a state where the light beams in different outer shapes are respectively incident on the left eye and the right eye, and said second state is a state where the light beams in the same outer shape are incident on the left eye and the right eye.

20. The stereoscopic display according to claim 19, wherein the light beams in said first outer shape and the light beams in said second outer shape have different colors.

21. The stereoscopic display according to claim 14, where in said first state and said second state are produced by light emitting elements in different vertical positions.

22. The stereoscopic display according to claim 14, wherein a different number of light emitting elements are viewed by a viewer in said first state and said second state.

23. The stereoscopic display according to claim 22, wherein said first state and said second state differ in the vertical positions of the light emitting elements.

24. The stereoscopic display according to claim 14, wherein said light emitting means is composed of a plurality of light emitting elements, and is so constructed as to satisfy the following equations, letting d be the distance from each of the light emitting elements to said barrier plate, P be a horizontal pitch between the light emitting elements, W1 be the horizontal width of each of the light emitting elements, W2 be the horizontal width of the slit of the barrier plate, D be the distance from the barrier plate to the viewer viewing at the first state, and E be the distance between the eyes of the viewer:

P=2E(W1+W2)/(E−W2)

d=DP/2E.

25. A stereoscopic display for separating light beams from a left eye image and a right eye image which are displayed on a display panel into left image light beams and right image light beams and supplying the left image light beams and the right image light beams to a viewer, comprising:

stereoscopic view position teaching means comprising light emitting means for emitting light beams, and light transmitting/shading means where a light shading portion and a light transmitting portion are so formed that said light beams from the light emitting means are only viewed when the viewer deviates at least in one of a rightward, leftward, upward and downward direction from a stereoscopic view position.

26. A stereoscopic display for separating light beams from a left eye image and a right eye image which are displayed on a display panel into left image light beams and right image light beams and supplying the left image light beams and the right image light beams to a viewer, comprising:

two sets of stereoscopic view position teaching means each comprising light emitting means for emitting light beams; and light transmitting/shading means where a light shading portion and a light transmitting portion are so formed that said light beams from the light emitting means are only viewed when the viewer deviates at least in one of a rightward, leftward, upward and downward direction from a stereoscopic view position, wherein the two sets of stereoscopic view position teaching means are arranged to be parallel to a display screen at a predetermined distance away therefrom and an approximately rhombic region where neither of the respective light beams from the two light emitting means is seen is formed corresponding to a stereoscopic view region.

27. A stereoscopic display for separating light beams from a left eye image and a right eye image which are displayed on a display panel into left image light beams and right image light beams and supplying the left image light beams and the right image light beams to a viewer, comprising:

stereoscopic view position teaching means comprising light emitting means for emitting light beams, and light transmitting/shading means where a light shading portion and a light transmitting portion are so formed that said light beams from the light emitting means are only viewed from a stereoscopic view position are not viewed when the viewer deviates at least in one of a rightward, leftward, upward and downward direction from a stereoscopic view position.

28. A stereoscopic display for separating light beams from a left eye image and a right eye image which are displayed on a display panel into left image light beams and right image light beams and supplying the left image light beams and the right image light beams to a viewer, comprising:

two sets of stereoscopic view position teaching means each comprising light emitting means for emitting light beams, and light transmitting/shading means where a light shading portion and a light transmitting portion are so formed that said light beams from the light emitting means are not viewed when the viewer deviates at least in one of a rightward, leftward, upward and downward direction from a stereoscopic view position, wherein the two sets of stereoscopic view position teaching means are arranged to be parallel to a display screen at a predetermined distance away therefrom and an approximately rhombic region where both the respective light beams from the two light emitting means are seen is formed corresponding to a stereoscopic view region.

29. A stereoscopic display for separating light beams from a left eye image and a right eye image which are displayed on a display panel into left image light beams and right image light beams and supplying the left image light beams and the right image light beams to a viewer; comprising:

stereoscopic view position teaching means comprising light emitting means for emitting light beams using a part of a display screen of said display panel, and light transmitting/shading means having a light shading portion and a light transmitting portion for separating a light beam from a left eye image and a light beam from a right eye image rightward and leftward, such that said light beams from the light emitting means are only seen when the viewer deviates at least in one of a rightward, leftward, upward and downward direction from a stereoscopic view position.

30. The stereoscopic display according to claim 29, wherein said light emitting means is so formed that the viewer in a position different from the stereoscopic view position can view an arrow indicating direction of said stereoscopic view position.

31. A stereoscopic display for separating light beams from a left eye image and a right eye image which are displayed on a display panel into left image light beams and right image light beams and supplying the left image light beams and the right image light beams to a viewer, comprising:

stereoscopic view position teaching means comprising light emitting means for emitting light beams, a condenser lens provided in front of said light emitting means on the side of the viewer for collecting the light beams from the light emitting means and introducing the light beams into the left eye and the right eye of the viewer, and a transparent sheet interposed between the light emitting means and said condenser lens having patterns of images so formed thereon wherein said light emitting means, said transparent sheet, and said condenser lens are positioned and constructed such that the patterns which can be viewed by the viewer in a stereoscopic view position and the patterns which can be viewed by the viewer in a position different from the stereoscopic view position are visually distinguishable from each other.

32. The stereoscopic display according to claim 31, wherein the patterns formed on said transparent sheet are so formed that an arrow pointing toward the stereoscopic view position can be viewed when the viewer deviates rightward and leftward and upward and downward from the stereoscopic view position.

33. The stereoscopic display according to claim 31, wherein the patterns formed on said transparent sheet are so formed that the patterns which can be respectively viewed by the viewer in a plurality of stereoscopic view positions are the same.

34. The stereoscopic display according to claim 31, wherein the patterns formed on said transparent sheet are so formed as to be changed as said viewer moves.

35. The stereoscopic display according to claim 34, wherein the patterns formed on said transparent sheet are so formed as to be changed in accordance with the distance said viewer moves.

36. The stereoscopic display according to claim 34, wherein the patterns formed on said transparent sheet are so formed as to be changed when said viewer moves a predetermined distance.

* * * * *